United States Patent
Kunkel et al.

(10) Patent No.: US 10,946,824 B2
(45) Date of Patent: Mar. 16, 2021

(54) SIDE UNDERRIDE GUARD

(71) Applicant: Wabash National, L.P., Lafayette, IN (US)

(72) Inventors: David P. Kunkel, Lebanon, IN (US); Brian C. Belcher, Brownsburg, IN (US); Andrzej Wylezinski, Lafayette, IN (US); Mark Ehrlich, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 79 days.

(21) Appl. No.: 16/130,248

(22) Filed: Sep. 13, 2018

(65) Prior Publication Data

US 2019/0077470 A1  Mar. 14, 2019

Related U.S. Application Data

(60) Provisional application No. 62/557,977, filed on Sep. 13, 2017.

(51) Int. Cl.
*B60R 19/56* (2006.01)
*B62D 35/00* (2006.01)
*B62D 21/20* (2006.01)

(52) U.S. Cl.
CPC ............ *B60R 19/565* (2013.01); *B62D 21/20* (2013.01); *B62D 35/001* (2013.01); *B62D 35/008* (2013.01)

(58) Field of Classification Search
CPC ....... B60R 19/56; B60R 19/565; B62D 21/20; B62D 35/001; B62D 35/008
USPC ...................................................... 296/180.4
See application file for complete search history.

(56) References Cited

U.S. PATENT DOCUMENTS

| | | |
|---|---|---|
| 164,252 A | 6/1875 | Bass |
| 221,817 A | 11/1879 | Heyn |
| 357,800 A | 2/1887 | Wescott |
| 495,801 A | 4/1893 | Henthorne |
| 564,027 A | 7/1896 | Pratt |
| 824,541 A | 6/1906 | Hager |
| 1,127,241 A | 2/1915 | Hawksworth |
| 1,482,637 A | 2/1924 | Fergusson |
| 2,231,089 A | 2/1941 | Rorer |

(Continued)

FOREIGN PATENT DOCUMENTS

| | | |
|---|---|---|
| CA | 2651688 A1 | 7/2009 |
| CA | 2715304 A1 | 3/2011 |

(Continued)

OTHER PUBLICATIONS

Non-Final Office Action issued in corresponding U.S. Appl. No. 12/760,798, dated Oct. 13, 2011, 12 pages.

(Continued)

*Primary Examiner* — Jason S Daniels
(74) *Attorney, Agent, or Firm* — Quarles & Brady LLP

(57) ABSTRACT

A side underride system configured to be coupled to a trailer is provided. The side underride system includes a support system, including a brace system and a cable, configured to be positioned below the trailer to provide side underride protection. The brace system includes a plurality of cross-braces that each extend across a width of the trailer and are spaced apart at intervals along a length of the trailer. The cable is configured to extend across the intervals between the cross-braces.

19 Claims, 18 Drawing Sheets

(56) References Cited

U.S. PATENT DOCUMENTS

| | | | |
|---|---|---|---|
| 2,318,863 A | 5/1943 | Jabelmann | |
| 2,737,411 A | 3/1956 | Potter | |
| 2,862,333 A | 12/1958 | Gardiol | |
| 3,256,655 A | 6/1966 | Teeter | |
| 3,401,953 A | 9/1968 | Prohl | |
| 3,483,939 A | 12/1969 | Maddock | |
| 3,487,999 A | 1/1970 | Nash | |
| 3,608,928 A | 9/1971 | Hooker | |
| 3,707,804 A | 1/1973 | Cook | |
| 3,711,146 A | 1/1973 | Madzsar | |
| 3,852,965 A | 12/1974 | Rudd | |
| 3,859,797 A | 1/1975 | Ayers | |
| 4,006,932 A | 2/1977 | McDonald | |
| 4,045,962 A | 9/1977 | Preus | |
| 4,060,268 A | 11/1977 | Page, Jr. | |
| 4,103,918 A | 8/1978 | Salden | |
| 4,104,884 A | 8/1978 | Preus | |
| 4,142,755 A | 3/1979 | Keedy | |
| 4,190,381 A | 2/1980 | Knaus et al. | |
| 4,236,745 A | 12/1980 | Davis | |
| 4,262,961 A | 4/1981 | Schmidt | |
| 4,282,946 A | 8/1981 | MacGuire | |
| 4,352,502 A | 10/1982 | Leonard et al. | |
| 4,418,853 A * | 12/1983 | Shaffer | B62D 33/00 224/401 |
| 4,421,333 A | 12/1983 | Van Dyke | |
| 4,544,094 A | 10/1985 | Scholey | |
| 4,611,847 A | 9/1986 | Sullivan | |
| 4,688,824 A | 8/1987 | Herring | |
| 4,746,160 A | 5/1988 | Wiesemeyer | |
| 4,877,266 A | 10/1989 | Lamparter et al. | |
| 4,943,204 A | 7/1990 | Ehrlich | |
| 4,989,782 A | 2/1991 | McKie | |
| 5,058,945 A | 10/1991 | Elliott, Sr. et al. | |
| 5,094,744 A | 3/1992 | Scovell | |
| 5,152,228 A | 10/1992 | Donkin | |
| 5,280,990 A | 1/1994 | Rinard | |
| D354,726 S | 1/1995 | Fitzgerald et al. | |
| 5,489,137 A | 2/1996 | Herrmeyer | |
| 5,607,200 A | 3/1997 | Smidler | |
| 5,673,953 A | 10/1997 | Spease | |
| 5,823,531 A | 10/1998 | Huber | |
| 5,823,610 A | 10/1998 | Ryan et al. | |
| 5,921,617 A | 7/1999 | Loewen et al. | |
| 6,079,769 A | 6/2000 | Fannin et al. | |
| 6,089,629 A | 7/2000 | Hope et al. | |
| 6,092,861 A | 7/2000 | Whelan | |
| 6,109,675 A | 8/2000 | Sumrall | |
| 6,116,667 A | 9/2000 | Torcomian | |
| 6,257,654 B1 | 7/2001 | Boivin et al. | |
| 6,286,894 B1 | 9/2001 | Kingham | |
| 6,309,010 B1 | 10/2001 | Whitten | |
| 6,409,252 B1 | 6/2002 | Andrus | |
| 6,443,492 B1 | 9/2002 | Barr et al. | |
| 6,467,833 B1 | 10/2002 | Travers | |
| 6,485,087 B1 | 11/2002 | Roberge et al. | |
| 6,595,578 B1 | 7/2003 | Calsoyds et al. | |
| 6,626,475 B2 | 9/2003 | Schroeder | |
| 6,641,206 B1 | 11/2003 | Bergstrom et al. | |
| 6,644,720 B2 | 11/2003 | Long et al. | |
| 6,666,498 B1 | 12/2003 | Whitten | |
| 6,742,835 B1 | 6/2004 | Floarea | |
| 6,799,791 B2 | 10/2004 | Reiman et al. | |
| 6,837,536 B1 | 1/2005 | Schwartz | |
| 6,893,079 B1 | 5/2005 | Johnson et al. | |
| 6,915,611 B2 | 7/2005 | Reiman et al. | |
| 6,959,958 B2 | 11/2005 | Basford | |
| 6,969,106 B1 * | 11/2005 | Hankel | B60J 7/102 296/100.18 |
| 6,974,166 B2 | 12/2005 | Ledford et al. | |
| 6,974,178 B2 | 12/2005 | Ortega et al. | |
| 7,059,819 B2 | 6/2006 | Brackmann et al. | |
| 7,086,674 B2 | 8/2006 | Goertz | |
| 7,093,889 B2 | 8/2006 | Graham | |
| 7,134,820 B2 | 11/2006 | Ehrlich | |
| 7,147,270 B1 | 12/2006 | Andrus et al. | |
| 7,163,258 B2 | 1/2007 | Dyer, II et al. | |
| 7,188,875 B2 | 3/2007 | Norelius | |
| 7,347,154 B2 | 3/2008 | Evans | |
| 7,404,592 B2 | 7/2008 | Reiman et al. | |
| 7,407,204 B2 | 8/2008 | Eriksson et al. | |
| 7,431,381 B2 | 10/2008 | Wood | |
| 7,497,502 B2 | 3/2009 | Wood | |
| 7,537,270 B2 | 5/2009 | OGrady | |
| 7,578,541 B2 | 8/2009 | Layfield et al. | |
| 7,604,284 B2 | 10/2009 | Reiman et al. | |
| 7,665,716 B2 | 2/2010 | Reast | |
| 7,686,385 B2 | 3/2010 | Dolan et al. | |
| 7,740,303 B2 | 6/2010 | Wood | |
| 7,748,772 B2 | 7/2010 | Boivin et al. | |
| 7,780,224 B2 | 8/2010 | Roush | |
| 7,837,254 B2 | 11/2010 | Reiman et al. | |
| 7,887,120 B2 | 2/2011 | Boivin et al. | |
| 7,938,475 B2 | 5/2011 | Boivin et al. | |
| 7,942,466 B2 | 5/2011 | Reiman et al. | |
| 7,942,467 B2 | 5/2011 | Boivin et al. | |
| 7,942,468 B2 | 5/2011 | Boivin et al. | |
| 7,942,469 B2 | 5/2011 | Boivin et al. | |
| 7,942,470 B2 | 5/2011 | Boivin et al. | |
| 7,942,471 B2 | 5/2011 | Boivin et al. | |
| 7,950,721 B1 | 5/2011 | Peterson | |
| 7,967,349 B2 | 6/2011 | Puppini et al. | |
| 8,162,384 B2 | 4/2012 | Giromini et al. | |
| 8,177,286 B2 | 5/2012 | Brown et al. | |
| 8,186,745 B2 | 5/2012 | Graham et al. | |
| 8,191,956 B1 | 6/2012 | Dixon, Jr. et al. | |
| 8,210,599 B2 | 7/2012 | Butler | |
| 8,292,351 B2 | 10/2012 | Boivin et al. | |
| 8,303,025 B2 | 11/2012 | Senatro | |
| 8,376,450 B1 | 2/2013 | Long et al. | |
| 8,382,194 B2 | 2/2013 | Wood | |
| 8,398,150 B2 | 3/2013 | Brown et al. | |
| 8,408,570 B2 | 4/2013 | Heppel et al. | |
| 8,496,286 B1 | 7/2013 | Katz et al. | |
| 8,540,304 B2 | 9/2013 | Kint | |
| 8,579,359 B2 | 11/2013 | Brown et al. | |
| 8,608,122 B2 | 12/2013 | Mancina et al. | |
| 8,616,616 B2 | 12/2013 | van Raemdonck | |
| 8,783,758 B2 | 7/2014 | Baker | |
| 8,801,078 B2 | 8/2014 | Brown et al. | |
| 8,857,893 B2 | 10/2014 | Reiman et al. | |
| 8,899,660 B1 | 12/2014 | Praskovskaya et al. | |
| 8,973,973 B2 | 3/2015 | Kronemeyer | |
| 8,979,172 B2 | 3/2015 | Reiman et al. | |
| 8,985,677 B2 | 3/2015 | Wiegel | |
| 9,004,575 B2 | 4/2015 | Grandominico et al. | |
| 9,045,176 B1 | 6/2015 | Henderson, II | |
| 9,139,241 B1 | 9/2015 | Smith | |
| 9,199,673 B2 | 12/2015 | Baker | |
| 9,199,676 B2 | 12/2015 | Brown et al. | |
| 9,211,919 B2 | 12/2015 | Senatro | |
| 9,296,433 B2 | 3/2016 | Roush | |
| 9,308,949 B1 | 4/2016 | Mihelic et al. | |
| 9,340,240 B2 | 5/2016 | Clark | |
| 9,352,714 B2 | 5/2016 | Balzer et al. | |
| 9,463,759 B1 | 10/2016 | Kiefer | |
| 9,487,171 B2 | 11/2016 | Rogers et al. | |
| 9,487,245 B2 | 11/2016 | Sjoberg et al. | |
| 9,506,488 B2 | 11/2016 | Mancina et al. | |
| 9,573,636 B2 | 2/2017 | Grandominico et al. | |
| 9,669,883 B2 | 6/2017 | Bassily et al. | |
| 9,908,493 B1 | 3/2018 | Kiefer | |
| 9,957,991 B2 | 5/2018 | Mancina et al. | |
| 2003/0178611 A1 | 9/2003 | Anderson | |
| 2005/0040637 A1 | 2/2005 | Wood | |
| 2005/0067204 A1 | 3/2005 | Rijsbergen et al. | |
| 2005/0115776 A1 | 6/2005 | Doerflinger et al. | |
| 2005/0161976 A1 | 7/2005 | Ortega et al. | |
| 2006/0152038 A1 | 7/2006 | Graham | |
| 2006/0182580 A1 | 8/2006 | Petersen | |
| 2006/0254182 A1 | 11/2006 | Cerasi et al. | |
| 2007/0024086 A1 | 2/2007 | Shishikura | |
| 2007/0037479 A1 | 2/2007 | Margay | |
| 2007/0114757 A1 | 5/2007 | Vickroy | |

(56) References Cited

U.S. PATENT DOCUMENTS

| | | |
|---|---|---|
| 2007/0120397 A1 | 5/2007 | Layfield et al. |
| 2007/0176466 A1 | 8/2007 | Dolan et al. |
| 2008/0061597 A1 | 3/2008 | Reiman et al. |
| 2008/0061598 A1 | 3/2008 | Reiman et al. |
| 2008/0093887 A1 | 4/2008 | Wood |
| 2008/0116702 A1 | 5/2008 | Enz et al. |
| 2008/0265049 A1 | 10/2008 | Stadlbauer |
| 2009/0189414 A1 | 7/2009 | Boivin et al. |
| 2009/0212595 A1 | 8/2009 | Heppel et al. |
| 2009/0212596 A1 | 8/2009 | Reiman et al. |
| 2009/0218848 A1 | 9/2009 | Boivin et al. |
| 2010/0096880 A1 | 4/2010 | Boivin et al. |
| 2010/0096881 A1 | 4/2010 | Boivin et al. |
| 2010/0096882 A1 | 4/2010 | Boivin et al. |
| 2010/0096883 A1 | 4/2010 | Boivin et al. |
| 2010/0098481 A1 | 4/2010 | Boivin et al. |
| 2010/0231000 A1 | 9/2010 | Andrus et al. |
| 2010/0264690 A1* | 10/2010 | Brown .................. B62D 25/168 296/180.4 |
| 2010/0264691 A1 | 10/2010 | Giromini et al. |
| 2011/0025092 A1 | 2/2011 | Reiman et al. |
| 2011/0062749 A1 | 3/2011 | Graham et al. |
| 2011/0148142 A1 | 6/2011 | Kint |
| 2011/0175396 A1 | 7/2011 | Boivin et al. |
| 2011/0204677 A1 | 8/2011 | Wood et al. |
| 2011/0285167 A1 | 11/2011 | Butler |
| 2012/0074728 A1 | 3/2012 | Senatro |
| 2012/0091754 A1 | 4/2012 | Lee et al. |
| 2012/0169086 A1 | 7/2012 | Giromini et al. |
| 2012/0200113 A1 | 8/2012 | Brown et al. |
| 2012/0235441 A1 | 9/2012 | Dayton |
| 2012/0319428 A1 | 12/2012 | Wood |
| 2013/0119701 A1 | 5/2013 | Dayton |
| 2013/0181477 A1 | 7/2013 | Reiman et al. |
| 2013/0270857 A1 | 10/2013 | Brown et al. |
| 2013/0285411 A1 | 10/2013 | Layfield et al. |
| 2014/0035318 A1 | 2/2014 | Brown et al. |
| 2014/0110968 A1 | 4/2014 | Henderson |
| 2014/0159419 A1 | 6/2014 | Baker et al. |
| 2014/0252799 A1 | 9/2014 | Smith |
| 2014/0333089 A1 | 11/2014 | Brown et al. |
| 2015/0175221 A1 | 6/2015 | Popa |
| 2015/0259014 A1 | 9/2015 | Baker et al. |
| 2016/0068202 A1 | 3/2016 | Senatro |
| 2016/0096558 A1 | 4/2016 | Bassily et al. |
| 2016/0121940 A1 | 5/2016 | Courtney et al. |
| 2016/0152285 A1 | 6/2016 | Wiegel |
| 2016/0244108 A1 | 8/2016 | Tsuruta et al. |
| 2016/0368443 A1 | 12/2016 | Theethira Kushalappa et al. |
| 2017/0015369 A1 | 1/2017 | Senatro |
| 2018/0118143 A1 | 5/2018 | Ponder |
| 2018/0187708 A1 | 7/2018 | Mancina et al. |
| 2018/0304941 A1* | 10/2018 | Ehrlich .................. B62D 35/001 |

FOREIGN PATENT DOCUMENTS

| | | |
|---|---|---|
| CA | 2795076 A1 | 5/2013 |
| CA | 2810007 A1 | 9/2013 |
| CA | 2812316 A1 | 10/2013 |
| CA | 2860351 A1 | 2/2015 |
| CA | 2905596 A1 | 4/2016 |
| DE | 334664 C | 9/1921 |
| DE | 454156 C | 1/1928 |
| DE | 1291221 B | 3/1969 |
| DE | 1603529 A1 | 7/1971 |
| DE | 2064239 A1 | 7/1972 |
| DE | 2135202 A1 | 2/1973 |
| DE | 3121565 A1 | 12/1982 |
| DE | 3402586 A1 | 8/1985 |
| DE | 19606921 A1 | 8/1997 |
| DE | 10157838 A1 | 10/2002 |
| DE | 102012018487 A1 | 3/2014 |
| EP | 0738621 A1 | 10/1996 |
| EP | 0780268 A1 | 6/1997 |
| EP | 0857620 A1 | 8/1998 |
| EP | 2581509 A2 | 4/2013 |
| FR | 2482548 A1 | 11/1981 |
| GB | 912610 A | 12/1962 |
| JP | 2007223359 A | 9/2007 |
| KR | 20110059021 A | 6/2011 |
| NL | 1034363 C2 | 2/2009 |
| WO | 9748590 A1 | 12/1997 |
| WO | 03093066 A1 | 11/2003 |
| WO | 2004020268 A1 | 3/2004 |
| WO | 2005085009 A1 | 9/2005 |
| WO | 2008147218 A2 | 12/2008 |
| WO | 2009051551 A1 | 4/2009 |
| WO | 2013091232 A1 | 6/2013 |
| WO | 2014083376 A1 | 6/2014 |

OTHER PUBLICATIONS

Final Office Action issued in corresponding U.S. Appl. No. 13/413,998, dated Nov. 2, 2012, 7 pages.

Non-Final Office Action issued in corresponding U.S. Appl. No. 13/413,998, dated Jul. 10, 2012, 6 pages.

Non-Final Office Action issued in corresponding U.S. Appl. No. 13/448,931, dated Jun. 29, 2012, 12 pages.

Non-Final Office Action issued in corresponding U.S. Appl. No. 13/741,639, dated Apr. 5, 2013, 10 pages.

Non-Final Office Action issued in corresponding U.S. Appl. No. 13/847,111, dated Nov. 5, 2013, 5 pages.

Non-Final Office Action issued in corresponding U.S. Appl. No. 14/049,851, dated Dec. 31, 2013, 11 pages.

Non-Final Office Action issued in corresponding U.S. Appl. No. 14/100,071, dated Mar. 26, 2015, 21 pages.

Non-Final Office Action issued in corresponding U.S. Appl. No. 14/321,977, dated Apr. 3, 2015, 12 pages.

Non-Final Office Action issued in corresponding U.S. Appl. No. 14/457,222, dated Jun. 26, 2017, 10 pages.

Non-Final Office Action issued in corresponding U.S. Appl. No. 14/644,508, dated Nov. 10, 2015, 16 pages.

Final Office Action issued in corresponding U.S. Appl. No. 14/923,610, dated Dec. 13, 2016, 7 pages.

Non-Final Office Action issued in corresponding U.S. Appl. No. 14/923,610, dated Aug. 31, 2016, 7 pages.

Non-Final Office Action issued in corresponding U.S. Appl. No. 15/200,628, dated Jun. 30, 2017, 8 pages.

Non-Final Office Action issued in corresponding U.S. Appl. No. 15/252,377, dated Nov. 2, 2017, 12 pages.

International Search Report and Written Opinion issued in corresponding International Application No. PCT/US2010/031173, dated Jun. 14, 2010, 13 pages.

"AeroFlex Fairing™ product info page" Freight Wing Incorporated, 1 page. Retrieved from Internet on Jul. 7, 2010. http://www.freightwing.com/aeroflex96.htm.

"Belly Fairing™ product info page" Freight Wing Incorporated, 2 pages. Retrieved from internet on Jul. 7, 2010. http://www.freightwing.com/belly%20fairing.html.

"Freight Wing Chassis Belly Fairing product info page" Freight Wing Incorporated, 1 page. Retrieved from Internet on Jul. 7, 2010. http://www.freightwing.com/chassis.htm.

"Innovative Side Skirt Designs From Utility—A New Patent Pending Solution" 2010 Utility Trailer Manufacturing, Utility Brochure, www.utilitytrailer.com, 2 pages.

"LCL—Laydon Composites, Ltd.—Tractor Aerodynamics—Trailer Fairings" Feb. 7, 2009, 3 pages. Retrieved on Feb. 5, 2019. http://web.archive.org/web/20090207195226/http://www.laydoncomp.com/trailer-skirts.php.

"Low Rider Belly Fairing product info page" Freight Wing Incorporated, 1 page. Retrieved from Internet on Jul. 7, 2010. http://www.freightwing.com /lowrider.htm.

"MFS Skirt, Maximum Flex Skirt" Transtex Composite, 2 pages (undated material).

"Nu-Line® Introducing Nu-Line Aerodynamic Trailer Skirts" 2014 Nu-Line Products Inc., Brochure NLTS-0314, 2 pages.

(56) References Cited

OTHER PUBLICATIONS

"Side Skirt Fairing: Options | Aeroefficient—Aerodynamic Solution for the Trucking Industry", 2010 Aeroefficient, 12 pages. Retrieved from Internet on Jul. 7, 2010. http://www.aerofficient.com/side-options.html.
"Strehl—Trailer Blade Documents" Model 715 Advance Aerodynamic Trailer Skirt, 2009-2010 Strehl LLC., 5 pages. Retrieved from Internet on Jul. 7, 2010. http://strehlusa.com/products/trailerbladedocuments.html.
"Takler" 2009 Product catalog for Takler Srl, 31 pages.
"Trailer Fairings" Laydon Composites Ltd., 3 pages. Retrieved from Internet on Jul. 7, 2010. http://www.laydoncomp.cm/trailer-skirts.php.
"Trailerskirt™ Assembly Instructions" Jun. 12, 2009 REV. 8.0 supersedes all other version, Property of LCL, LCL-ENG-045, 7 pages.
"Windyne—Truck Fuel Savings, Aerodynamic Fairing, Aerodynamic Parts, Truck Industry" 2008 Windyne Corp, 2 pages. Retrieved from Internet on Jul. 7, 2010. http://www.windyne.com/features-functions.htm.

\* cited by examiner

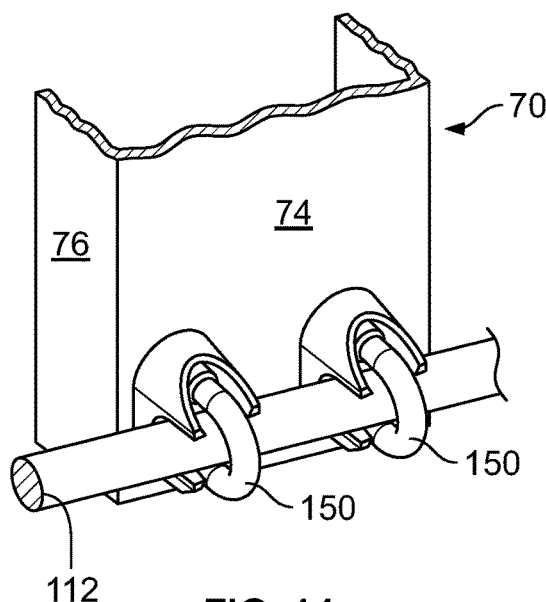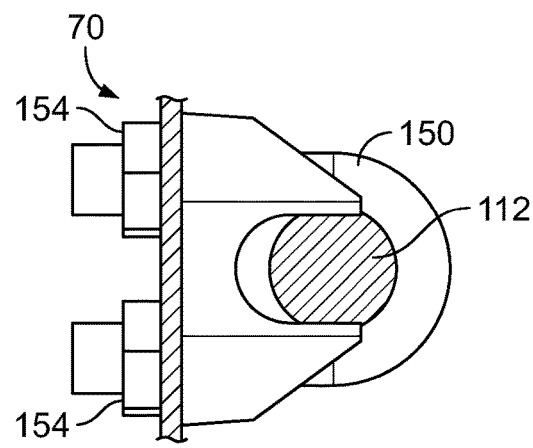
FIG. 14  FIG. 14A
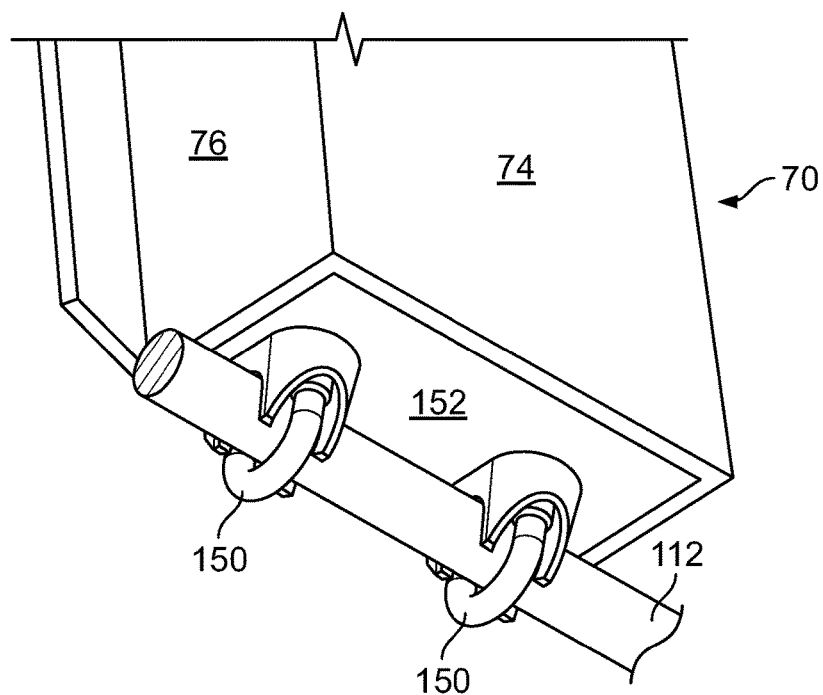
FIG. 15

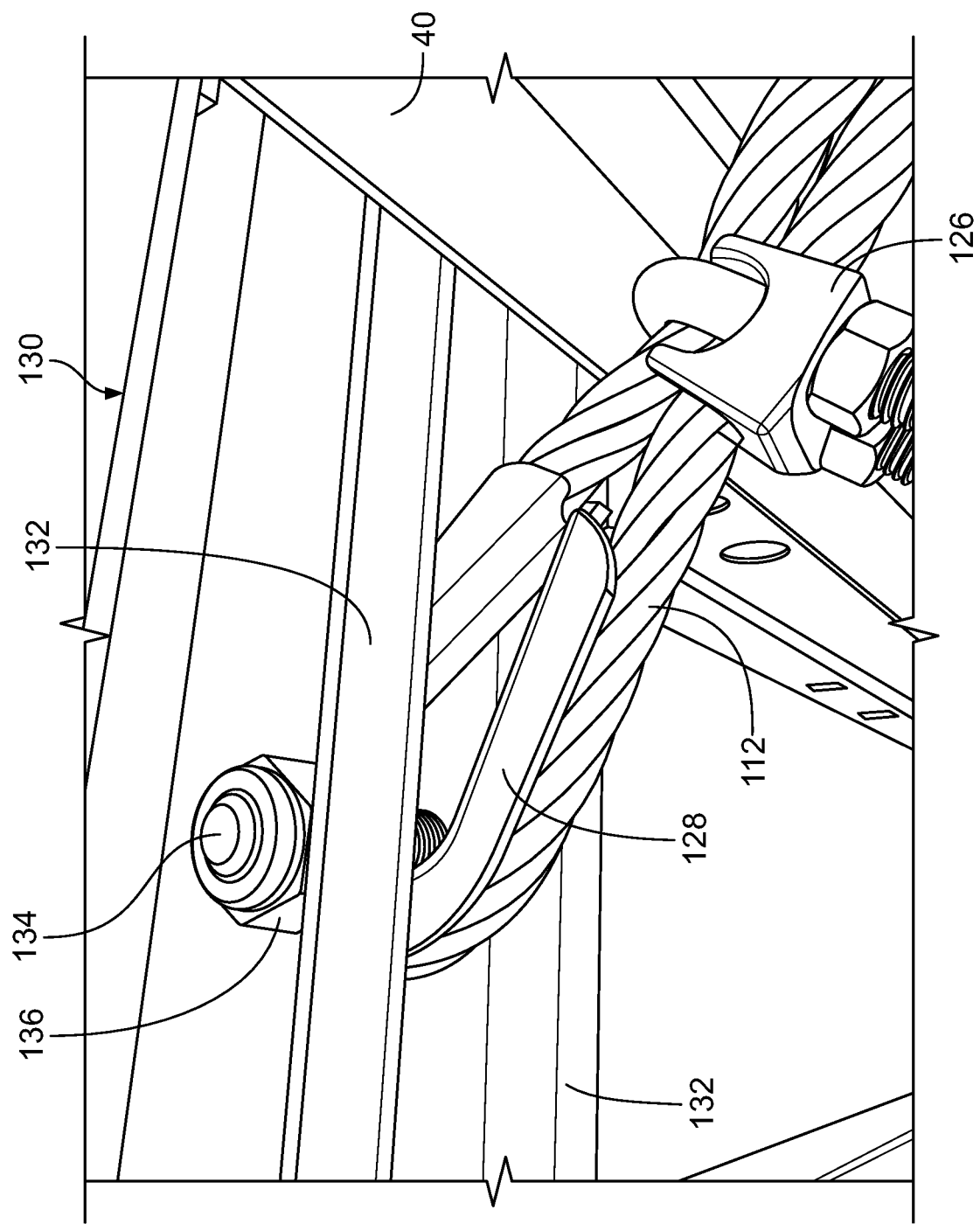

SIDE UNDERRIDE GUARD

CROSS REFERENCE TO RELATED APPLICATIONS

This application claims the benefit of U.S. Provisional Application Ser. No. 62/557,977 filed on Sep. 13, 2017, and entitled "Side Underride Guard," the disclosure of which is incorporated herein by reference in its entirety.

FIELD OF THE INVENTION

The present invention relates generally to semi-trailers, such as van-type trailers, for example. In particular, the present invention relates to both an aerodynamic side skirt system for reducing drag on such a trailer as well as a side underride system for preventing or reducing the extent to which an automobile may ride under the trailer in the event of a side impact collision, for example.

BACKGROUND

To reduce wind flow resistance and drag on a trailer, truck, semi-trailer, or other vehicle, side skirts that extend downwardly from a bottom of the trailer and/or chassis toward the roadway to partially enclose the floor assembly and undercarriage have been utilized.

Air flow passing under a ground vehicle imparts a drag force to the vehicle when it impinges on and flows around the vehicle undercarriage components attached to or a part of the underside of a vehicle. Side skirt systems are designed to prevent or control the flow of air from entering the undercarriage region from a side of the ground vehicle, such as a trailer of a tractor-trailer truck system, for example. Such reduction on the drag of the ground vehicle may operate to conserve fossil fuels as well as other sources of vehicle drive power for hybrid vehicles, battery-operated vehicles, and/or alternative fuel-based vehicles, for example.

Trailers typically have a higher elevation than passenger vehicles. This presents a risk that a passenger vehicle may underride the trailer in an accident, potentially resulting in damage to the underriding vehicle and injury to occupants therein. Accordingly, a side protection device, or underride guard, may be provided for use with a trailer in order to reduce the risk of such passenger vehicles underriding the trailer. Side protection devices are intended to reduce the extent to which a "passenger vehicle" (as defined in 49 C.F.R. Part 571) can intrude under the side of a trailer, diminishing passenger compartment intrusion.

SUMMARY

The present disclosure may comprise one or more of the following features and combinations thereof.

According to one embodiment of the disclosure, a side underride system configured to be coupled to a trailer is provided. The side underride system includes a support system, including a brace system and a cable, configured to be positioned below the trailer to provide side underride protection. The brace system includes a plurality of cross-braces that each extend across a width of the trailer and are spaced apart at intervals along a length of the trailer. The cable is configured to extend across the intervals between the cross-braces.

According to another embodiment, a side underride system underride system configured to be coupled to a trailer is provided. The side underride system includes a brace system with a plurality of cross-braces. Each cross-brace of the plurality of cross-braces comprises a first vertical post, a second vertical post opposite the first vertical post, a first truss beam oriented diagonally and coupled to a lower portion of the first vertical post and an upper portion of the second vertical post, and a second truss beam oriented diagonally and coupled to an upper portion of the first vertical post and a lower portion of the second vertical post so that the first truss beam and the second truss beam crisscross at an intersection point. Each cross-brace of the plurality of cross-braces extends across a width of the trailer and is configured to be coupled to the trailer as a subassembly unit so that the plurality of cross-braces are spaced apart from one another at intervals along a length of the trailer.

Accordingly to yet another embodiment, a method of installing a side underride system on a trailer is provided. The method includes welding a first bracket to a first cross member of a floor assembly of the trailer adjacent a first end of the first cross member and welding a second bracket to the first cross member adjacent a second end of the first cross member. The method also includes providing a first cross-brace comprising a first vertical post, a second vertical post opposite the first vertical post, a first truss beam oriented diagonally and coupled to a lower portion of the first vertical post and an upper portion of the second vertical post, and a second truss beam oriented diagonally and coupled to an upper portion of the first vertical post and a lower portion of the second vertical post so that the first truss beam and the second truss beam crisscross at an intersection point. The method further includes coupling the first vertical post to the first bracket and coupling the second vertical post to the second bracket.

These and other features of the present disclosure will become more apparent from the following description of the illustrative embodiments.

BRIEF DESCRIPTION OF THE DRAWINGS

FIGS. 14 and 14A are a partial perspective view and a partial side view, respectively, of a vertical post and a cable for use with a support system of a side underride system.

FIG. 15 is partial perspective view of another vertical post and a cable for use with a support system of a side underride system.

FIG. 19 is a partial perspective, rear, underside view of another anchor point for a cable system of the side underride system of FIG. 2.

DETAILED DESCRIPTION

Figure 1:
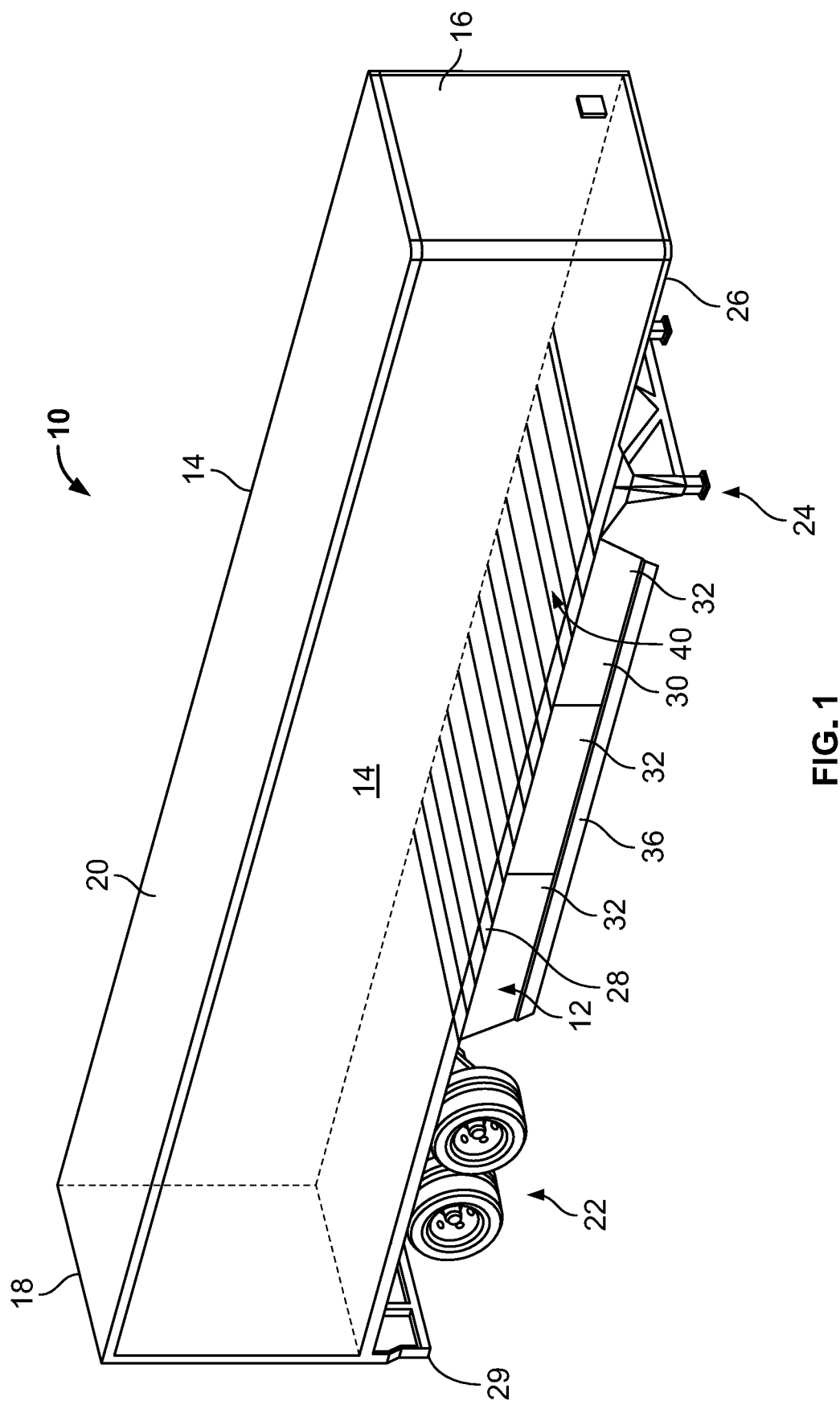
FIG. 1 is a perspective view of a trailer and an aerodynamic side skirt system coupled to the trailer between rear wheels and a landing gear, or front support, of the trailer, with a portions of trailer removed therefrom for clarity.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

For the purposes of promoting an understanding of the principles of the invention, reference will now be made to a number of illustrative embodiments shown in the attached drawings and specific language will be used to describe the same. While the concepts of this disclosure are described in relation to a box-type trailer, it will be understood that they are equally applicable to many types of trailers, semi-trailers, and tanks generally, and more specifically to conventional flat-bed trailers, box or van type trailers, and/or pup trailers, as well as straight truck bodies, small personal and/or commercial trailers and the like. Furthermore, while the concepts of this disclosure may be described in relation to a box-type trailers, it will be understood that that they are equally applicable to other trailers generally and any type of over-the-road storage container. Accordingly, those skilled in the art will appreciate that the present invention may be implemented in a number of different applications and embodiments and is not specifically limited in its application to the particular embodiments depicted herein.

Generally, some embodiments of the disclosure provide an integrated system of an aerodynamic side skirt and side underride protection in one common system. The system incorporates both an aerodynamic side skirt for reducing air drag on a trailer and a side underride guard for preventing or reducing the extent to which a vehicle may ride under the trailer, as well as preventing or reducing the extent to which a trailer body may intrude into the passenger compartment of the vehicle. In some embodiments, there is no clear division between the skirt and the guard; in other embodiments, the side underride guard may be retrofit with existing skirt systems; in yet other embodiments, the side underride guard may be a standalone system without a skirt. Generally, the systems described herein can help generate a retardation or restriction force to decelerate an impacting vehicle and absorb the vehicle's kinetic energy to prevent or reduce passenger compartment intrusion (PCI).

FIG. 1 depicts a trailer 10 including an aerodynamic skirt system or assembly 12 coupled to and extending downwardly from each side wall 14 of the trailer 10. Illustratively, the skirt system 12 operates to improve the aerodynamic efficiency of the trailer 10 by reducing drag and wind flow under the trailer 10. In particular, the skirt system 12 operates to reduce airflow under the trailer 10 while the trailer 10 is traveling down a road (e.g., being towed by a tractor, as a tractor/trailer combination). Reduction of airflow under the trailer 10 may increase the fuel efficiency, or the efficiency of any other such source of vehicle drive power, of the tractor/trailer combination. Illustratively, the skirt system 12, as well as other skirt systems described herein, extends below a side wall 14 of the trailer 10 at least partially along a length of the trailer. In particular, in some embodiments, the skirt system 12 extends generally between a landing gear 24 and a rear wheel assembly 22 of the trailer 10. However, the skirt systems described herein may be modified to extend along a greater or a lesser length of the trailer 10 than what is illustratively shown in the figures. In other words, the skirt systems disclosed herein may be modified to extend along the entire, or substantially the entire, length of the trailer 10 or may be modified to extend along only a small portion of the length of the trailer 10. Further, any of the skirt systems disclosed herein may be for structural and/or aerodynamic purposes.

As shown in FIG. 1, the trailer 10 includes side walls 14, a front end wall 16, a rear end wall 18, and a roof 20 defining an inside storage portion (not shown) able to store various articles or goods therein. The trailer 10 further includes the rear wheel assembly 22 and the front support or landing gear 24 each coupled to a bottom wall or floor assembly 26 of the trailer 10. Illustratively, the floor assembly 26 of the trailer 10 includes various laterally-extending cross members 40 and right and left base rails 28 coupled to the cross members 40 and extending along a length of the trailer 10. In some embodiments, the front end of the trailer 10 is configured to be coupled to a tractor (not shown) for towing the trailer 10 thereon, thus providing a tractor-trailer assembly. In other embodiments, a cab is integral with the storage compartment, for example, in refrigerated and dry truck bodies. Illustratively, while the specific trailer 10 is shown and described herein, other trailers including other components, such as composite floor assemblies, for example, which may or may not include any cross members 40 are contemplated as well.

As shown in FIG. 1, the skirt system 12 is coupled to the floor assembly 26 of the trailer 10 and extends downwardly from the base rail 28 of the trailer 10. Illustratively, the side skirt system 12 is positioned between the rear wheel assembly 22 and the front support 24 in order to prevent air from flowing laterally under the floor assembly 26 of the trailer 10 as the trailer 10 is towed by a tractor. It should be understood that while the aerodynamic side skirt system 12 is shown for use with a trailer 10, the side skirt system 12 and/or side underride guards disclosed herein may be coupled to any vehicle to reduce the drag thereon. Still further, while the embodiments disclosed herein are shown as being utilized with trailers, any of the embodiments disclosed herein may be coupled to any vehicle.

It should be noted that the trailer 10 of FIG. 1 includes two aerodynamic skirt systems 12. In particular, one system 12 is coupled to one side of the floor assembly 26 of the trailer 10 to extend downwardly from the floor assembly 26 generally parallel to the corresponding side wall 14 of the trailer 10, while the other system 12 is coupled to the other side of the floor assembly 26 to extend downwardly from the floor assembly 26 generally parallel to the corresponding side wall 14 of the trailer 10. In other words, a first skirt system 12 is configured to be positioned below the trailer 10 near a first side wall 14, and a second skirt system 12 is configured to be positioned below the trailer 10 near a second side wall 14. For purposes of the description herein, only one skirt system 12 will be described. However, it should be understood that the two skirt systems 12 of the trailer 10 are substantially identical or identical in configuration and function. Also, while the skirt systems 12 are shown as being parallel to the corresponding side walls 14, the skirt systems 12 may be angled or curved inwardly or outwardly relative to the side walls 14 at forward (toward the tractor) ends thereof, as further described below. In yet other embodiments, any suitable skirt system may be utilized.

Figure 2:
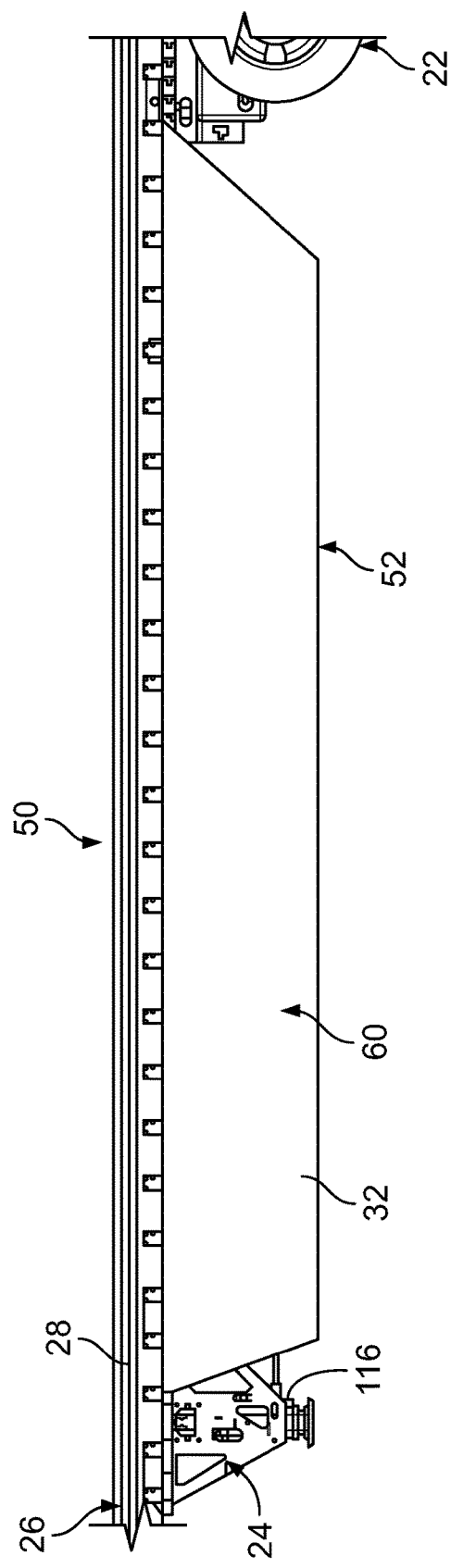
FIG. 2 is a side view of a side underride system including an aerodynamic side skirt system and a support system between portions of the side skirt system.

Generally, the skirt system 12 may include a side skirt wall 30 having one or more wall panels 32. For example, as shown in FIG. 1, the side skirt wall 30 may include three wall panels 32 coupled to each other. The wall panels 32 may be secured to each other and/or to the trailer 10 by one or more mounting bracket assemblies and/or other coupling mechanisms. The mounting bracket assemblies and/or other coupling mechanisms may include, but are not limited to, those structures described in U.S. Pat. No. 8,162,384, the entire content of which is incorporated herein by reference. Additionally, while the illustrated skirt system 12 includes three wall panels 32, it is within the scope of this disclosure to provide a skirt system 12 having any number of wall panels 32, or a single, unitary wall panel 32 (e.g., as shown in FIG. 2).

In some embodiments, the mounting bracket assemblies or other coupling mechanisms may allow the skirt system 12 to tilt laterally both inwardly and outwardly relative to the floor assembly 26 of the trailer 10, for example, for the skirt wall 30 to potentially avoid damage when the trailer 10 traverses into or over a fixed, immovable obstacle. In other embodiments, however, the skirt system 12 may be sufficiently rigidly mounted to the floor assembly 26 such that the skirt system 12 is generally prevented from tilting under normal wind and road air forces. Additionally, as shown in FIG. 1, the skirt system 12 may further include a flexible flap 36 (or multiple flexible flaps) coupled to the bottom edge of the wall panels 32 to provide additional airflow resistance. The flexible flap 36 may also prevent damage to the skirt wall 30 by being configured to bend or flex in response to forces applied vertically, such as in situations where the trailer 10 may traverse over a curb or railroad track where the road surface is not flat.

Illustratively, each wall panel 32 is made of a composite material. For example, the composite material may include a plastic core and metal outer skins coupled to the plastic core. Such a composite material provides a rigid, but lightweight and durable material. Illustratively, for example, each wall panel 32 may be made of a DURAPLATE® composite panel provided by Wabash National Corporation of Lafayette, Ind. DURAPLATE® composite panels are constructed of a high-density polyethylene plastic core bonded between two high-strength steel skins. It should be understood that other suitable composite materials may alternatively or additionally be used. For example, the wall panels 32 may be made of a sandwich composite including a honeycomb core and metal or plastic outer sheets, or the wall panels 32 may be made of a rigid or semi-rigid fiber-reinforced plastic composite. Further, the wall panels 32 may be of any number of suitable, non-composite materials such as metals, metal alloys, and/or plastics, for example.

In some embodiments, the above skirt system 12 may be structurally reinforced to provide additional side protection that may reduce the risk of an automobile underriding the trailer 10. For example, the skirt system 12 may be combined with a rigid and/or compressible support system 54 positioned underneath the trailer 10 and between the side skirt walls 30. As shown in FIGS. 2-7, a support system 54 is provided under the floor assembly 26 of the trailer 10 to form a side underride system 50. This combination skirt system 12 and support system 54 can thus provide dual functions of potentially improving aerodynamic efficiency and providing side underride protection. Alternatively, some support systems described herein may form standalone side underride systems that operate to provide side underride protection without a skirt system.

In some instances, the support system 54 may be retrofit into existing skirt systems 12 or installed with new skirt systems 12 or additional aerodynamic systems other than what is herein described. Alternatively, the support system 54 alone (that is, without a skirt system) may form the side underride system 50. In other words, the support system 54 may be an OEM side underride system design (that is, not for use as a retrofit with an existing skirt system) or, alternatively, may be used as a retrofit with existing skirt systems. For example, the support system 54 alone may potentially improve aerodynamic efficiency (i.e., by reducing air flow under the trailer 10) and may provide side underride protection. In particular, side underride systems may be contemplated within the scope of this disclosure to include side skirts or any other structures of any configuration and shape to provide a first outer surface positioned below the trailer 10 near the first side wall 14 and a second outer surface positioned below the trailer 10 near the second side wall 14 to reduce airflow under the trailer, where the surfaces permit any of the structures described herein to be positioned therebetween to potentially provide side underride protection.

Referring now to FIGS. 2-7, according to one illustrative embodiment, a side underride system 50 may include a skirt system 52 and a support system 54 with a brace system 56 and a cable system 58. While the skirt system 52 may provide aerodynamic properties, the brace system 56 may provide resistance generally perpendicular to, or at other angles relative to, the side walls 14, and the cable system 58 may provide stability to the brace system 56 and additional strength generally parallel to the side walls 14.

Illustratively, the skirt system 52 is coupled to the floor assembly 26 of the trailer 10 to extend downwardly from the side wall 14 and the base rail 28 at least partially along a length of the trailer 10. In some embodiments, as shown in FIG. 2, the skirt system 52 is positioned generally between the rear wheel assembly 22 and the landing gear 24 in order to prevent air from flowing laterally under the floor assembly 26 as the trailer 10 is towed by a tractor. In one specific application, this length may be about 16 feet. However, the skirt system 52 (or other skirt systems described herein) may be modified to extend along a greater or a lesser length of the trailer 10 than what is illustratively shown in the figures. In other words, the skirt systems disclosed herein, or the side underride systems or support systems disclosed herein, may be modified to extend along the entire, or substantially the entire, length of the trailer 10 (such as from the landing gear 24 to a rear impact guard 29 (shown in FIG. 1) extending downward from the rear end wall 18), or may be modified to extend along only a small portion of the length of the trailer 10.

Illustratively, the skirt system 52 includes a skirt wall 60. The skirt wall 60 may include similar structure and function as the skirt wall 30 described above. For example, the skirt wall 60 may be coupled to the floor assembly 26 (such as to the cross members 40 and/or the base rail 28) via one or more mounting bracket assemblies or other suitable coupling mechanisms, such as other suitable hinge(s), longitudinal straps, bars, and/or connectors. Additionally, in some embodiments, the base rail 28 may be modified to provide a direct coupling surface for the skirt wall 60. For example, the base rail 28 may extend further downward past the cross members 40 to provide a suitable surface to which the skirt wall 60 may be coupled.

Furthermore, the skirt wall 60 may include a single, substantially rigid or semi-rigid flat or curved wall panel 32, or multiple wall panels 32 coupled together. Generally, with respect to the integrated underride and skirt systems disclosed herein, the skirt wall 60 may be of any configuration and shape to form a uniform surface optimized to control air flow around the trailer sides to minimize the air drag on the trailer 10. In other words, the skirt wall 60, or any other structure, may be of any configuration and shape to provide a first outer surface positioned below the trailer 10 near the first side wall 14 and a second outer surface configured to be positioned below the trailer 10 near the second side wall 14 to reduce airflow under the trailer 10, where the surfaces permit any of the structures described herein to be positioned therebetween to provide side underride protection.

Illustratively, the skirt wall 60 may be made of any material to minimize weight, cost, and aid in equipment assembly, servicing, and maintenance. Example skirt wall materials, for use with any of the skirt walls described herein, may include, but are not limited to, DURAPLATE® composite panels, a continuous composite laminate, a molded composite sandwich panel (MCS) including a lightweight core and laminate webbing sandwiched between laminate outer skins, a metallic material sheet (such as an aluminum sheet), etc. Other suitable composite materials may alternatively or additionally be used, including, but not limited to, a sandwich composite including a honeycomb core and metal or plastic outer sheets, or a rigid or semi-rigid fiber-reinforced plastic composite. Further, the skirt wall 60 may be of any number of suitable, non-composite materials such as metals, metal alloys, and/or plastics, for example. Further, the skirt may include a textile or fabric such as a canvas or reinforced canvas which may be stretched and attached to the support system 54. However, any material may be used to form a smooth continuous aerodynamic surface with suitable strength to be an integral part of the side underride system 50, as well as to form suitable connections to the trailer 10. Additionally, the skirt wall 60, or any skirt wall described herein, may be substantially rigid or substantially flexible.

With respect to the support system 54, generally, the brace system 56 may be substantially rigid and arranged perpendicular to the side wall 14, and the cable system 58 may be coupled to a lower portion of the brace system 56 to limit movement of and help transfer loads across the brace system 56. More specifically, as shown in FIGS. 3-7, the brace system 56 may include a plurality of cross-braces 62 to provide side underride protection. The plurality of cross-braces 62 may be individually coupled to the floor assembly 26 along a length of the trailer 10, each oriented substantially vertically and spaced apart from one another.

With further reference to the brace system 56, each of the cross-braces 62 may be a separate subassembly unit of the support system 54 and spaced apart along a length of the trailer 10, for example, between the landing gear 24 and the rear wheel assembly 22, as shown in FIGS. 3-7, to provide impact protection along that length. Alternatively, the cross-braces 62 may span across the entire, or substantially the entire, length of the trailer 10 (such as from the landing gear 241 to the rear impact guard 29). In some embodiments, the cross-braces 62 may be spaced apart along a length equal to a length of the skirt wall 60. Alternatively, the cross-braces 62 may be spaced apart along a length less than or more than the length of the skirt wall 60. Additionally, the cross-braces 62 may extend downwardly from the floor assembly 26 far enough to provide substantial side impact protection, but still permit the trailer 10 to clear obstacles on a roadway. For example, in one application, the cross-braces 62 may extend downwardly from the floor assembly 26 so that a ground clearance from the bottom of the cross-braces 62 is approximately 16 inches to approximately 22 inches.

Figure 3:
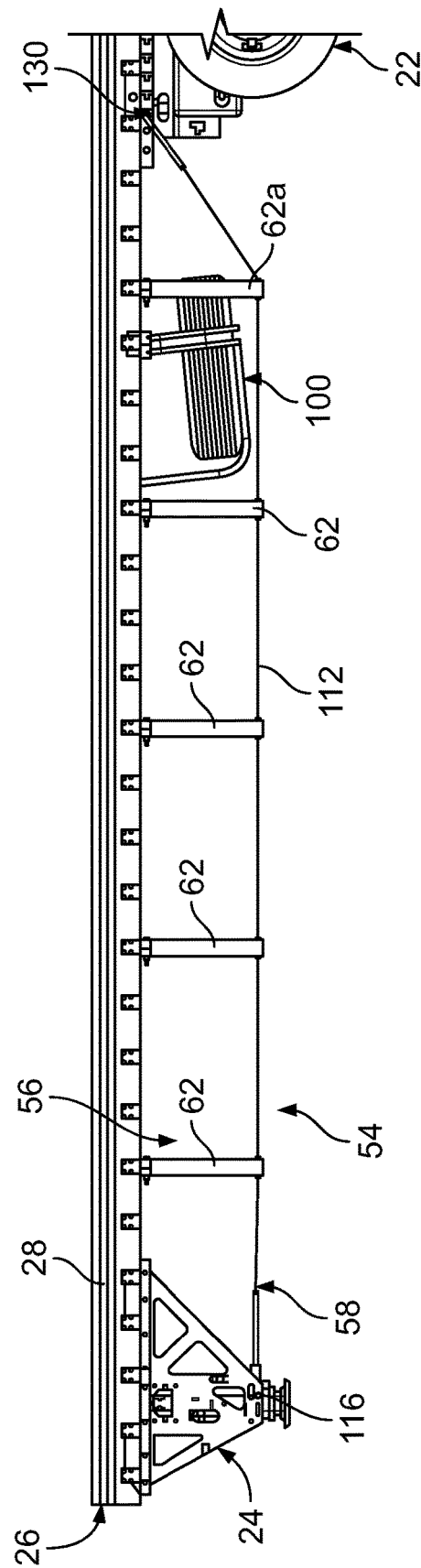
FIG. 3 is a side view of the side underride system of FIG. 2 with the side skirt system removed for clarity.
Figure 4:
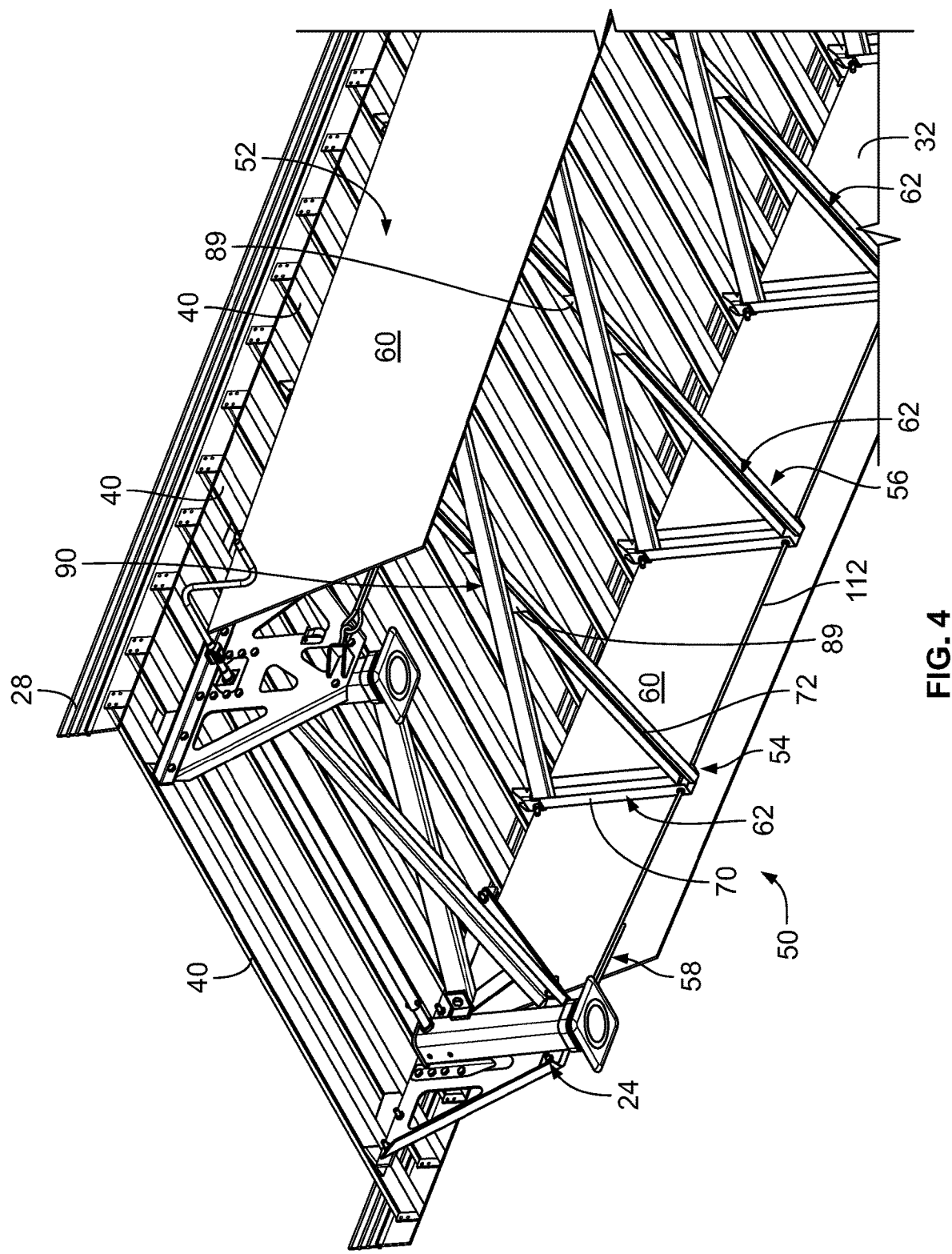
FIG. 4 is a partial perspective, front, underside view of the side underride system of FIG. 2.
Figure 5:
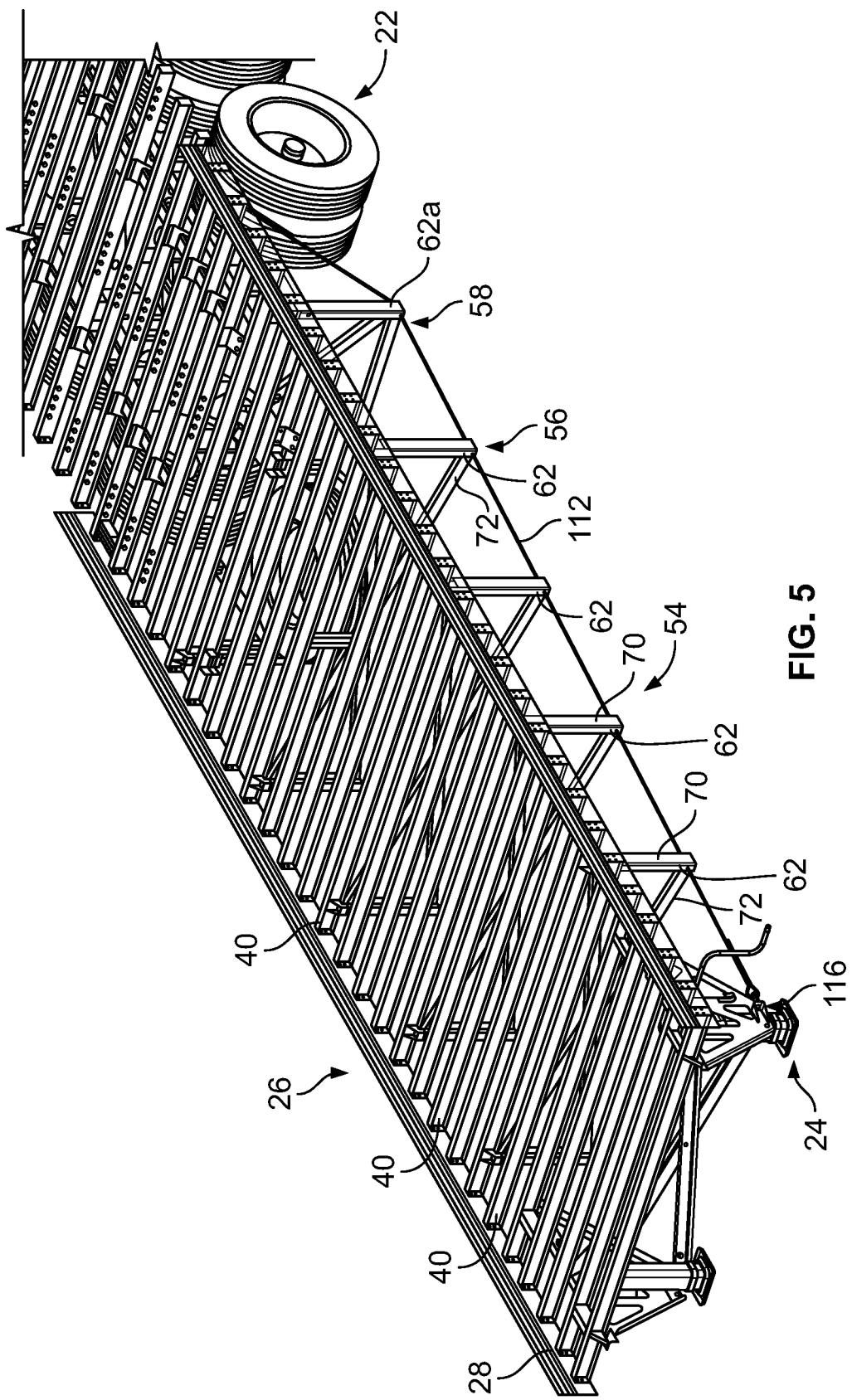
FIG. 5 is a perspective front, topside view of the side underride system of FIG. 2 with the side skirt system removed for clarity.
Figure 6:
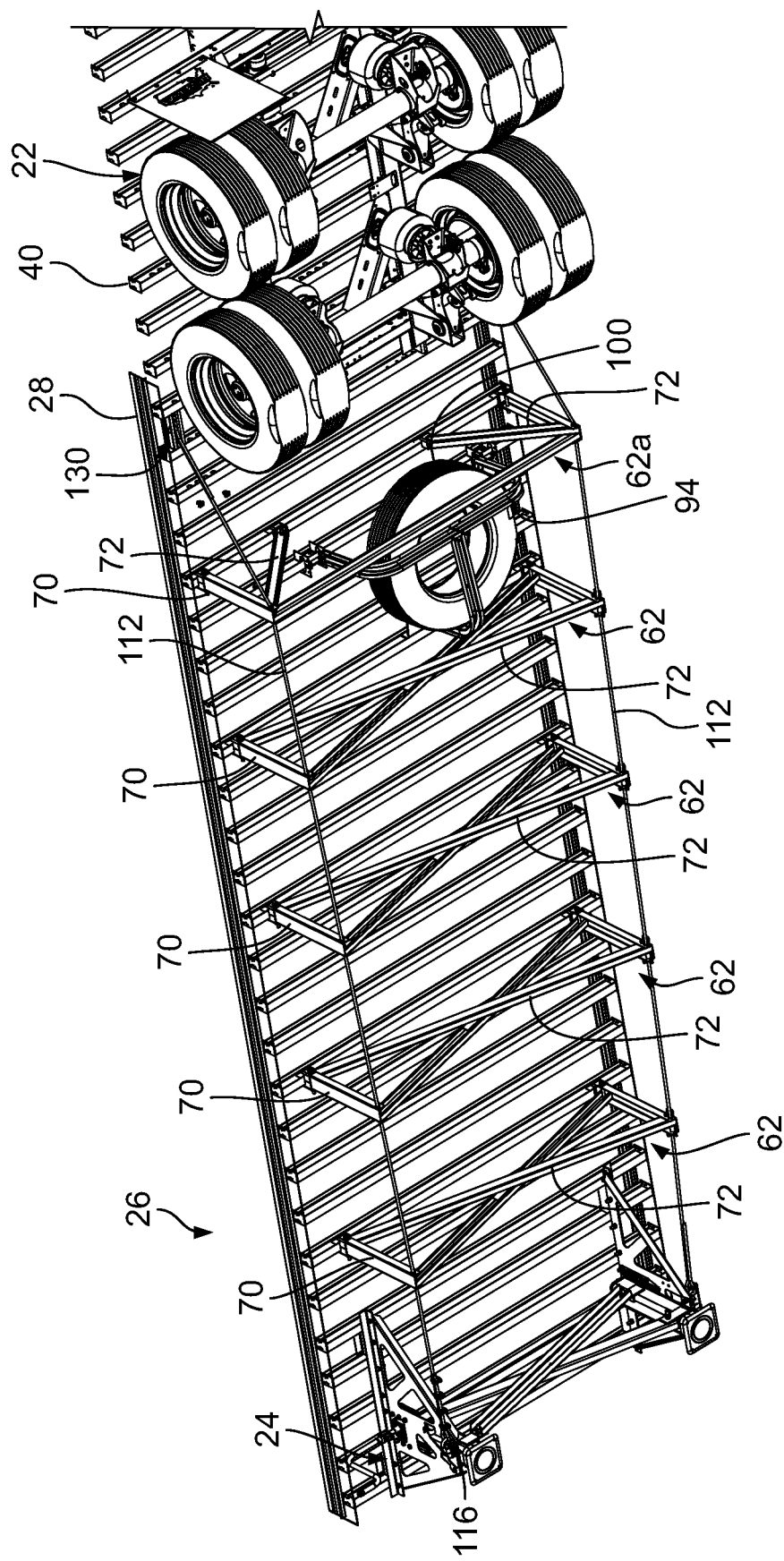
FIG. 6 is a perspective rear, underside view of the side underride system of FIG. 2 with the side skirt system removed for clarity.

Illustratively, the cross-braces 62 may be spaced apart at specific intervals to increase the chances that a passenger vehicle colliding with the skirt wall 60 will engage at least one of the cross-braces 62 upon impact. More specifically, to potentially increase the chances that a passenger vehicle colliding with a skirt wall 60 will engage at least one of the cross-braces 62 upon impact, the cross-braces 62 may be spaced apart along the length of the trailer 10 at intervals less than an average car width. In one example, as shown in FIGS. 3-7, the system 50 may include five cross-braces 62 spaced apart at four-foot intervals, with a forward-most cross-brace 62 located adjacent, or at, the landing gear 24 and a rearward-most cross-brace 62a located adjacent, or forward of, the rear wheel assembly 22. Notably, in some embodiments, the rearward-most cross-brace 62a may include a different structure that is configured to accommodate a spare tire carrier 100, as shown in FIGS. 3 and 6. Further, other cross-braces 62 may be provided with a mechanism to hold the spare tire carrier 100. In another example, the side underride system 50 may include four cross-braces 62 spaced apart at five-foot intervals. It should also be noted that other interval widths (constant or variable) may be contemplated within the scope of this disclosure.

Figure 7:
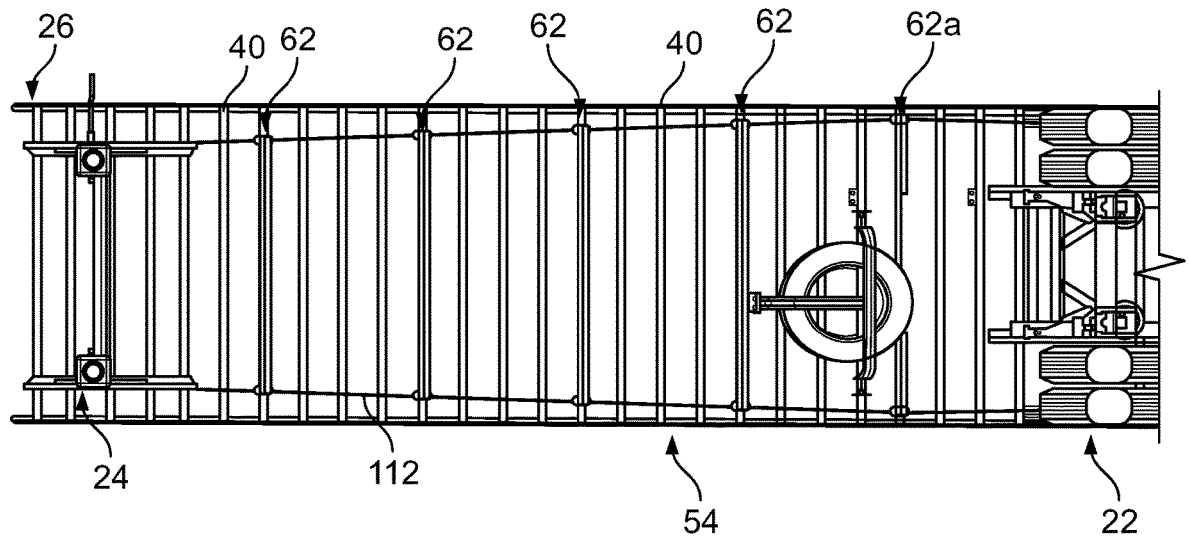
FIG. 7 is a bottom elevational view of the side underride system of FIG. 2 with the side skirt system removed for clarity.

Furthermore, each cross-brace 62 may extend across a width of the trailer 10. In some applications, all cross-braces 62 span an entire width between the side walls 14 of the trailer 10. In other applications, some or all of the cross-braces 62 may span less than the entire width between the side walls 14, and each cross-brace 62 may span the same or different widths. For example, in applications where each skirt wall 60 is coupled directly below and parallel to a respective side wall 14, the cross-braces 62 may each span the entire width between side walls 14 (e.g., about eight feet in one application). In applications where the skirt walls 60 form an angled or curved profile from the front of the trailer 10 to the rear of the trailer 10, the cross-braces 62 may span varying widths (e.g., that increase from the front of the trailer 10 to the rear of the trailer 10, as shown in FIG. 7) so that each cross-brace 62 spans from one skirt wall 60 to the opposite skirt wall 60. As a result, the more forward cross-braces 62 are shorter in width than the more rearward cross-braces 62. Accordingly, in such applications, the brace system 56 does not run parallel to the side walls 14, but rather is angled to correspond to the angle of the skirt system 52.

Figure 8:
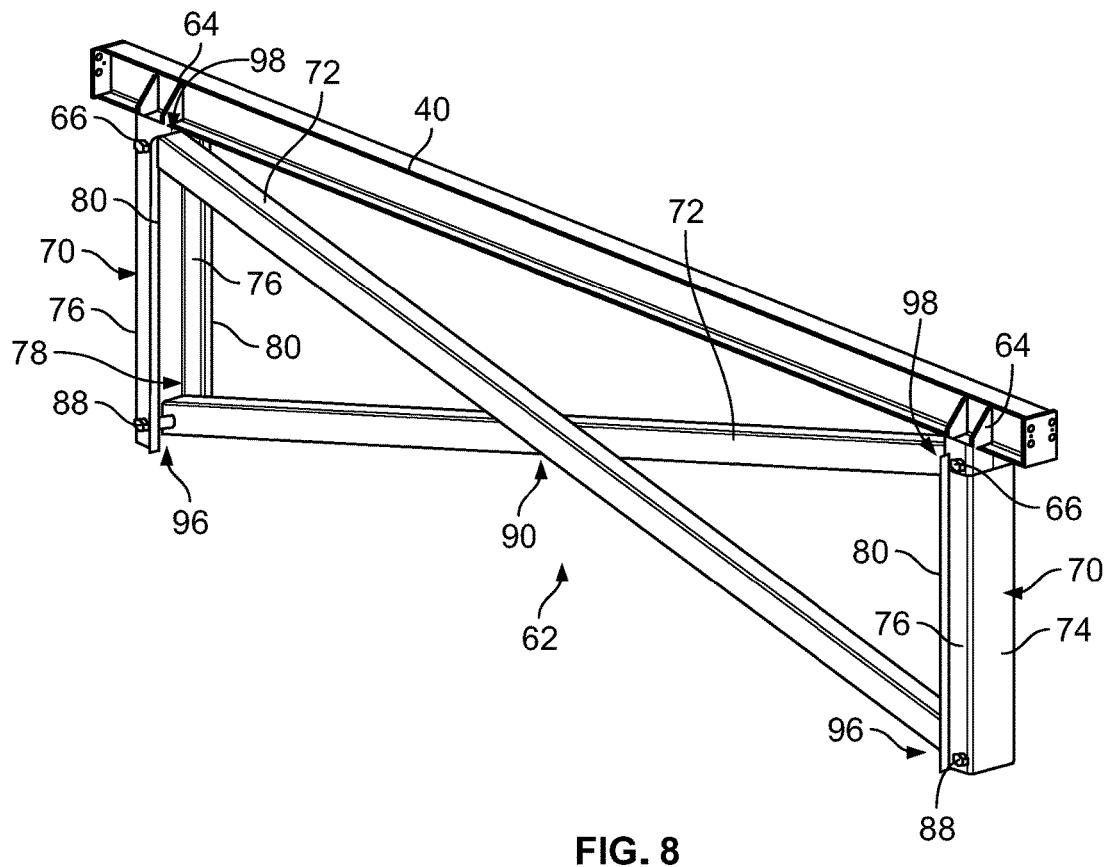
FIG. 8 is a perspective view of a cross-brace for use with the support system of the side underride system of FIG. 2.
Figure 8A:
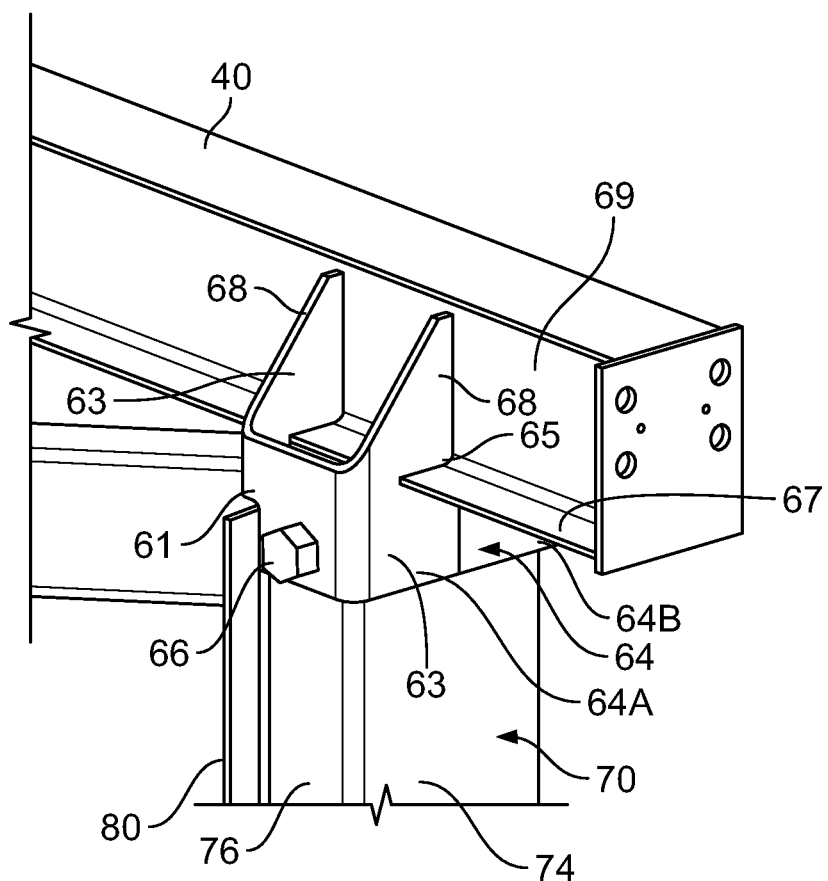
FIG. 8A is an enlarged perspective view of a portion of the cross-brace of FIG. 8, showing a bracket for use with the support system of the side underride system of FIG. 2.

To couple the cross-braces 62 along a length of the trailer 10, each cross-brace 62 may individually be coupled directly to a respective cross member 40 of the floor assembly 26. For example, in some embodiments, a cross-brace 62 may be coupled to a cross member 40 using one or more brackets 64, as shown in FIG. 8. More specifically, one or more brackets 64 may be welded to a cross member 40 (e.g., adjacent each end 97, 99 of the cross member 40), and the cross-brace 62 may be bolted to each bracket 64 via a bolt and nut combination 66 (or connected via another suitable coupling). Additionally, while two brackets 64 are shown in FIG. 8, it is within scope of this disclosure to include additional brackets 64 or weld points along the cross member 40 (such as the four-bracket arrangement shown in FIG. 11, or another arrangement not specifically shown or described herein). Furthermore, while a two-part bracket design is shown in FIGS. 8 and 8A (e.g., having first and second identical parts 64A, 64B), the bracket 64 of some embodiments may have a two-part design having non-identical parts, or may be a single component.

The welded connection points created by the brackets 64 may help distribute vertical and horizontal loads from the cross-braces 62 to the floor assembly 26. For example, as shown in FIG. 8A, each part 64A, 64B of a respective bracket 64 can be substantially C-shaped, having a back face 61 and two side faces 63 extending from the back face 61. Each of the side faces 63 can include a cutout 65. As a result, the respective part 64A, 64B can slide onto a lower flange 67 of a cross member 40 (e.g., the lower flange 67 is received within the cutouts 65) until an upper portion 68 of each side face 63 contacts webbing 69 of the cross member 40. The bracket 64 is then welded to the cross member 40 at one or more contact points between the two components (e.g., along the webbing 69 and/or upper, side, or lower portions of the lower flange 67). Alternatively, in some embodiments, the bracket 64 can be configured to contact and be welded to only an underside of the cross member 40 (that is, the lower portion of the lower flange 67).

Illustratively, a cross-brace 62 can be coupled to a bracket 64 by the bolt and nut combination 66 (or a rivet or other suitable fastener). More specifically, at least a vertical post 70 of the cross-brace 62 can be coupled to the bracket 64 via the bolt and nut 66. For example, two faces of the vertical post 70 (e.g., an outer face 74 and a side face 76) can rest against an inside of the bracket 64 so that apertures (not shown) of the back faces 61 of the bracket parts 64A, 64B and the side faces 76 of the vertical post 70 are aligned, allowing the bolt and nut 66 to secure the components together through the aligned apertures. As a result, the vertical post 70 of the cross-brace 62 may be coupled to the cross member 40 via the bracket 64.

In some embodiments, welding can be performed as a sub-assembly process during manufacturing of the floor assembly 26. More specifically, the brackets 64 can be welded to a respective cross member 40, and then the cross member 40 may be assembled into the floor assembly 26. Once the floor assembly 26 is assembled, the vertical posts 70 of the cross-braces 62 can be coupled to the brackets 64. Accordingly, the brace system 56 may be manufactured when the floor assembly 26 is being manufactured (e.g., as part of an OEM process). Alternatively, in some embodiments, the brace system 56 may be retrofitted onto an existing floor assembly 26. In either manner, welding the brackets 64 to the cross members 40 (and then coupling the vertical posts 70 to the brackets 64) may provide an easier installation process than directly welding or coupling the vertical posts 70 to the cross members 40. Accordingly, the cross-braces 62 may come as pre-assembled subassembly units of the brace system 56 that can be individually installed on or removed from the floor assembly 26 via the brackets 64. However, direct couplings between the vertical posts 70 and the cross members 40 may also be contemplated in some embodiments.

Figure 9:
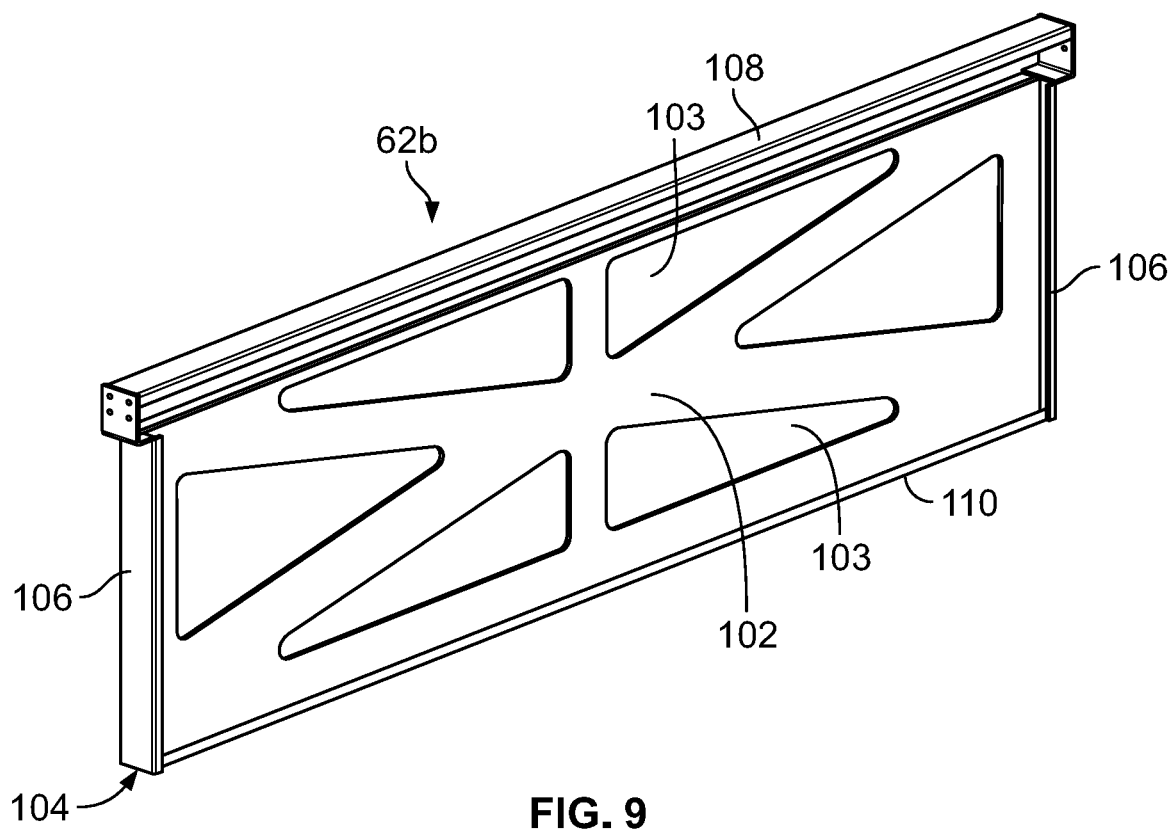
FIG. 9 is a perspective view of another cross-brace for use with the support system of the side underride system of FIG. 2.

In some embodiments, each cross-brace 62 may be coupled to a respective cross member 40 through other coupling methods, such as bolting, fasteners, and/or other suitable couplings. Alternatively, in some embodiments, one or more cross members 40 may be replaced with an integrated member that serves as both a cross member and a cross-brace. For example, as shown in FIG. 9 and further described below, a cross-brace 62b may include an integrated cross member 108. Additionally, in some embodiments, one or more cross-braces 62 may be further coupled to the skirt walls 60. For example, the cross-braces 62 and the skirt walls 60 may be coupled together via self-tapping bolts, rivets, or another suitable connector (not shown). In one embodiment, the skirt wall 60 can be coupled to each vertical post 70 using three connectors along the length of the vertical post 70. However, in other embodiments, one, two, or more connectors can be used at each vertical post 70 to couple the skirt wall 60 to the vertical post 70.

Accordingly, to install the skirt system 52, the skirt walls 60 may be coupled to the support system 54 (such as to the vertical posts 70) and/or to the floor assembly 26 (such as the cross members 40, the base rail 28, or another component). Furthermore, the skirt walls 60 may be spaced apart from the support system 54 in some embodiments. In one example, the skirt walls 60 are coupled to the vertical posts 70 of the cross-braces 62 and also to cross members 40 of the floor assembly 26 at locations between the cross-braces 62. Additionally, in some embodiments, the skirt walls 60 can be coupled to the support system 54 in a way that still permits at least part of the skirt walls 60 to flex inward or outward. For example, as described above, each skirt wall 60 can be coupled to at least the vertical posts 70 at one or more connection points along the length of the vertical posts 70. And a lower part of the skirt wall 60 (e.g., below the bottom-most connection point) is able to flex inward and outward. In one example, the skirt wall 60 is coupled to the vertical posts 70 so that the lower flexible part, below the bottom-most connection point, is about 7 inches to about 10 inches in height.

Illustratively, each cross-brace 62 may include one or more truss members or beams with various cross-sections that offer suitable column compression and buckling strength. For example, as shown in FIG. 8, the cross-brace 62 may include the vertical posts 70 on each end 97, 99, and two truss beams 72 crisscrossed between the two vertical posts 70. More specifically, one of the truss beams 72 is coupled to an upper portion 98 of a first vertical post 70 at one end 97 and to a lower portion 96 of a second vertical post 70 at another end 99, while the other truss beam 72 is coupled to a lower portion 96 of the first vertical post 70 at the one end 97 and to an upper portion 98 of the second vertical post 70 at the other end 99. As a result, the truss beams 72 are oriented diagonally opposite from each other to form an X-shape. Herein, "upper portion 98" may generally refer to any portion along an upper half of a respective vertical post 70 and "lower portion 96" may generally refer to any portion along a lower half of the vertical post 70.

Figure 10:
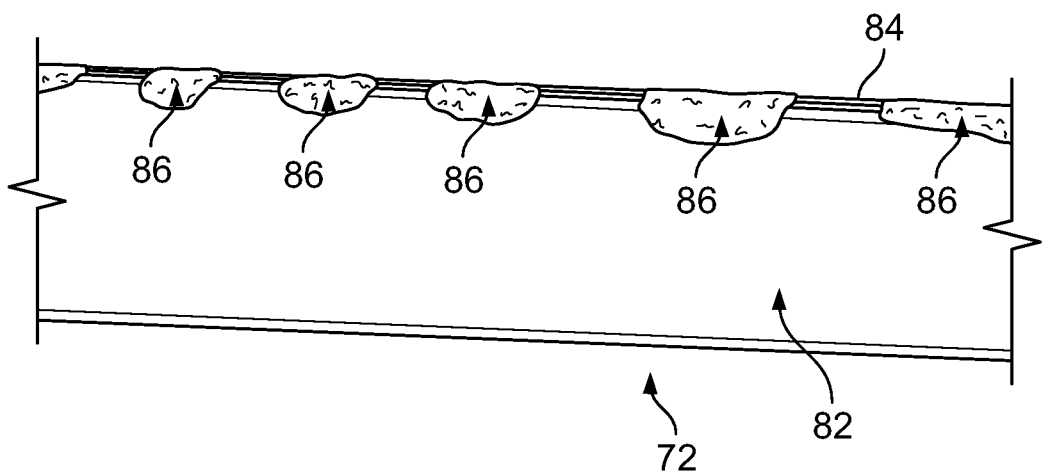
FIG. 10 is a partial perspective view of a truss beam for use with a cross-brace of the support system of the side underride system of FIG. 2.
Figure 11:
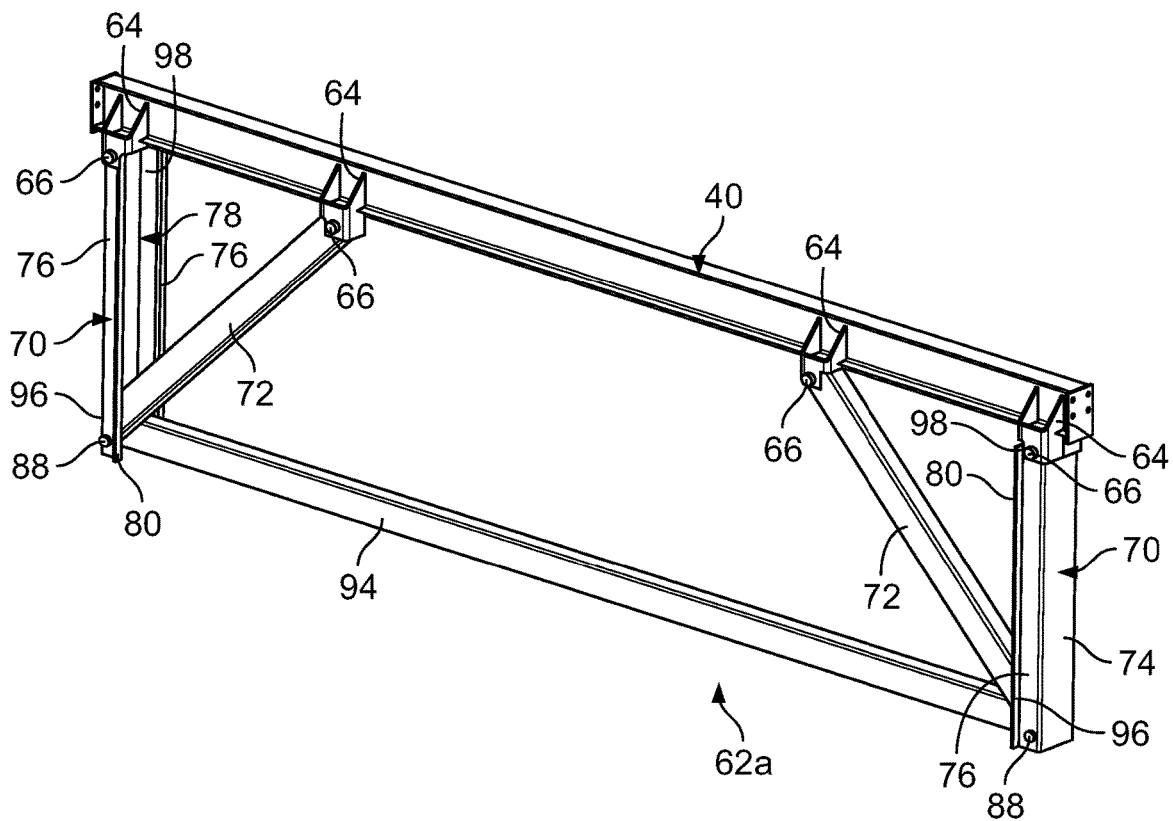
FIG. 11 is a perspective view of another cross-brace for use with the support system of the side underride system of FIG. 2.

As shown in FIGS. 8 and 11, each vertical post 70 may be generally C-shaped, having a solid outer face 74, solid side faces 76, and an open inner face 78. Each side face 76 may also include outer flanges 80 that extend outward away from the opposing side face 76 (as shown in FIGS. 8 and 8A). Additionally, the vertical posts 70 may be oriented opposite each other so that each open inner face 78 of the vertical posts 70 faces inward (e.g., faces toward the opposite vertical post 70 across the floor assembly 26). In some embodiments, as shown in FIGS. 4 and 6, each truss beam 72 may be also C-shaped (that is, with three solid faces and an open face to create a C-channel). In such embodiments, as shown in FIGS. 4 and 6, the open face of the crisscrossing truss beams 72 can face each other. In other embodiments, as shown in FIGS. 8 and 10, each truss beam 72 may be box-shaped. More specifically, as shown in FIG. 10, each truss beam 72 may include a C-shaped beam 82 (that is, with three solid faces and an open face to create a C-channel) with a fourth plate 84 coupled over the open face of the C-shaped beam 82, thus creating a box-shaped channel with four solid faces. Illustratively, the fourth plate 84 may be stitch welded to the C-shaped beam 82, having weld portions 86 spaced apart across the coupling length, as shown in FIG. 10. In one embodiment, the truss beam 72 includes weld portions 86 every two inches across the length the truss beam 72. However, other intervals may be contemplated within the scope of this disclosure. Alternatively, in some embodiments, the box-shaped truss beam 72 may be formed as a one-piece extruded component.

Illustratively, the truss beams 72 may be coupled to each vertical post 70. More specifically, in one embodiment, each truss beam 72 may fit inside the C-shaped channel created by the open face 78 of the vertical post 70, and one or more bolts 66, 88 may be inserted through the side faces 76 and the truss beam 72 to couple the two components together, as shown in FIG. 8. Accordingly, in some embodiments, at the upper portion 98 of the vertical post 70, the truss beam 72, the vertical post 70, and the bracket 64 can be coupled together via the same bolt and nut combination 66. Furthermore, the truss beams 72 may be loaded (e.g., pre-loaded) in compression, and welded or otherwise coupled together at an intersection point 90 to provide further structural integrity of the cross-brace 62. In other embodiments, however, the truss beams 72 may be pinned, bolted, bonded, hinged, or otherwise coupled together at the intersection point 90.

Additionally, in some embodiments, when the truss beams 72 are C-shaped, an additional weld plate 89 (as shown in FIG. 4) may be used at the intersection point 90 to weld together the truss beams 72. In some embodiments, when the truss beams 72 are box-shaped, the fourth plates 84 of the truss beams 72 may be arranged to face each other so that the fourth plates 84 are welded together at the intersection point 90. Also, while welding together the truss beams 72 may provide structural integrity to the cross-brace 62, the stitch welding of the truss beams 72 may allow for additional compression upon an impact to help absorb the force of the impact. More specifically, upon a side impact collision, the truss beam 72 may act as a shock absorber by compressing or folding slightly between the stitch welds to help absorb the force of the impact. As a result of this compression, a post-impact truss beam 72 may appear rippled between the stitch welds.

According to another example, as shown in FIG. 11, a cross-brace 62a may include two vertical posts 70, a lower horizontal beam 94, and two diagonal truss beams 72. Illustratively, each truss beam 72 is only coupled to a single vertical post 70. More specifically, one truss beam 72 is coupled to a lower portion 96 of a respective vertical post 70 at one end 97, and further coupled to a cross member 40. The other truss beam 72 is coupled to a lower portion 96 of a respective vertical post 70 at the other end 99, and further coupled to the cross member 40. Thus, the truss beams 72 of the cross-brace 62a do not crisscross. Rather, the first truss beam 72, coupled at the one end 97, is coupled the cross member 40 closer to the one end 97 than the other end 99, and the second truss beam 72, coupled at the other end 99, is coupled to the cross member 40 closer to the other end 99. As shown in FIG. 11, the truss beams 72 may be each coupled to the cross member 40 via a welded bracket 64, as described above (e.g., the truss beams 72 may be bolted to a respective bracket 64, and the bracket 64 is welded to the cross member 40). Additionally, the lower horizontal beam 94 may be coupled to the vertical posts 70 at lower portions 96 thereof, such as at the same connection point between the vertical post 70 and the diagonal truss beam 72. As a result, only one bolt 88 through the lower portion of each vertical post 70 may be necessary for coupling both the truss beam 72 and the horizontal beam 94.

Figure 12:
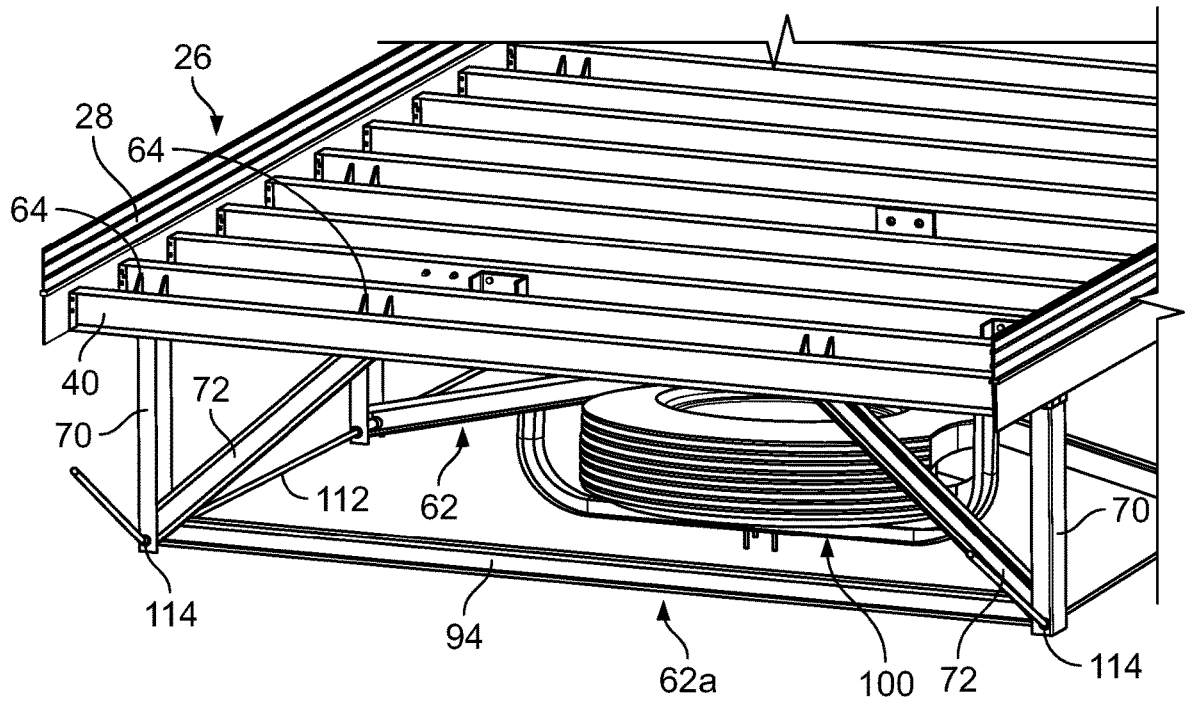
FIG. 12 is a partial perspective, rear view of the side underride system of FIG. 2, including the cross-brace of FIG. 11.

Illustratively, the spacer-type cross-brace arrangement of FIG. 11 may provide sufficient strength for side impact protection but also allow space for one or more accessories positioned along an underside of the floor assembly 26. For example, as shown in FIGS. 6 and 12, the cross-brace 62a allows space for the spare tire carrier 100. Additionally, the cross-brace 62a may allow space to accommodate and/or reduce tangling of slider hoses of an antilock braking system of the trailer 10 (not shown).

In some embodiments, the brace system 56 may include all X-shaped cross-braces 62 (the configuration shown in FIG. 8), all spacer-type cross-braces 62a (the configuration shown in FIG. 11), or a combination thereof. According to one example, as shown in FIGS. 5-6, the brace system 56 includes a plurality of X-shaped cross-braces 62 and a rear-most spacer-type cross-brace 62a. However, it is within the scope of this disclosure to include other combinations of these cross-braces 62 and/or other types of cross-braces not shown or described herein.

While the above-described cross-braces 62 include separate truss beams 72, it is also within the scope of this disclosure to include one or more unitary cross-braces. For example, in another illustrative embodiment, a cross-brace 62b may include a unitary structure with truss-like bracing or webbing. More specifically, referring back to FIG. 9, a cross-brace 62b may include a truss-like webbing 102 surrounded by a frame 104. The frame 104 may include at least two vertical posts 106 on each end 97, 99 of the cross-brace 62b and, optionally, an upper and/or a lower horizontal post 108, 110. In some embodiments, the upper horizontal post 108 may be coupled to a cross member 40 of the floor assembly 26. In other embodiments, as shown in FIG. 9, the upper horizontal post 108 acts as an integral floor support cross member. As a result, the cross-brace 62b includes the additional depth and strength to replace a standard cross member 40 of the floor assembly 26 to help support loading cycles and the payload of the trailer 10 during transit. Additionally, as shown in FIG. 9, the webbing 102 can include one or more openings 103, for example, to assist proper compression and force absorption upon impact.

Other configurations of truss beams in addition to those illustrated and described herein may be contemplated within the scope of this disclosure. Furthermore, the cross-braces 62 described herein may include material that is substantially rigid, but lightweight. For example, the cross-braces 62 may include any suitable material such as, but not limited to, metallic extrusions (such as extruded aluminum), roll formed high-strength aluminum alloy or high-strength steel, fiber reinforced polymeric matrix pultrusions, galvanized steel sheet stampings, or any other suitable material or materials. Generally, such a suitable material may include suitable strength and light-weight features, and be conducive to form strong connections via welding, riveting, bolting, bonding or other methods. For example, the cross-braces 62 may also or alternatively include compression molded composite laminates and/or foam cores structures, such as compression-molded, fiberglass-reinforced plastic.

It should be noted that, while the cross-braces 62 are described and illustrated herein as being coupled to or integral with cross members 40, it is within the scope of this disclosure to couple the cross-braces 62 to any part of the floor assembly 26 using, for example, fasteners, adhesives, or other suitable coupling methods. Furthermore, while the floor assemblies 26 are described and illustrated herein as including cross members 40, it is within the scope of this disclosure to couple the cross-braces 62 to floor assemblies 26 of trailers 10 without cross members 40.

As described above, the cross-braces 62, via the truss beams 72 or truss-like structures 102, may provide sufficient strength and support between the skirt walls 60 to help reduce the chances of vehicle underride during a side impact collision. Furthermore, due to the interlocking truss beams 72 or truss-like structures 102, the cross-braces 62 may operate to absorb some of the force and energy of any impact thereto to potentially decrease any forces on the passengers within an automobile that impacts the trailer 10. The cross-braces 62 may also compress, deflect, or collapse slightly under impact (i.e., under lateral forces) to further absorb such forces.

Accordingly, each cross-brace 62, including two vertical posts 70 and interlocking truss beams 72, forms a standalone subassembly unit of the brace system 56 that can be individually coupled the floor assembly 26 of the trailer 10. Furthermore, each cross-brace 62 can be individually coupled to the floor assembly 26 at any point along the length of the trailer 10 and at any distance from an adjacent cross-brace 62. That is, because the cross-braces 62 are standalone subassembly units, and because the cross-braces 62 only contain a transverse component and not a longitudinal component (that is, they only extend across a width of the trailer 10 and do not have components that extend forward or rearward), an interval between cross-braces 62 need not be uniform or previously set, but instead can be variable along the length of the trailer 10 and can be determined or set at the time of install. For example, at the time of install, a first cross-brace 62 can be installed on the trailer 10, then a second cross-brace 62 can be installed on the trailer 10 a first distance away from the first cross-brace 62, and a third cross-brace 62 can be installed on the trailer 10 a second distance away from the second cross-brace 62, where the first and second distances may be equal or different. Additionally, because the cross-braces 62 are standalone subassembly units, they can be individually installed and removed without requiring installation or removal of the entire brace system 56.

Referring now to the cable system 58 of the support system 54, as shown in FIGS. 3-7, the cable system 58 may include one or more cables 112 that traverse the intervals between adjacent cross-braces 62. In other words, the cable system 58 can be coupled to and interconnect the cross braces 62 of the brace system 56. In one example, the cable 112 may be routed through the cross-braces 62 in tension to form the support system 54 having connected cross-braces 62 across a length of the trailer 10. In another example, the cable 112 may be otherwise coupled to adjacent cross-braces 62 across a length of the trailer 10 in tension to form the support system 54 having connected cross-braces 62. Generally, while the brace system 56 alone may provide side underride protection, the cable system 58 may provide further protection by helping transfer loads across the brace system 56, limiting movement of the cross-braces 62, and/or maintaining outer surfaces of the cross-braces 62 in a plane substantially parallel to the side walls 14.

Illustratively, the cable 112 may be routed through or otherwise coupled to the vertical posts 70 adjacent or under the lower portion 96 of each vertical post 70. As a result, the cable 112 may further assist to limit movement (e.g., lateral movement) of the cross-braces 62 and maintain the vertical posts 70 in a substantially vertical orientation (that is, along a plane substantially parallel to the side walls 14). However, in other embodiments, the cable 112 may be routed or coupled at any location along the height of the vertical posts 70.

Figure 13:
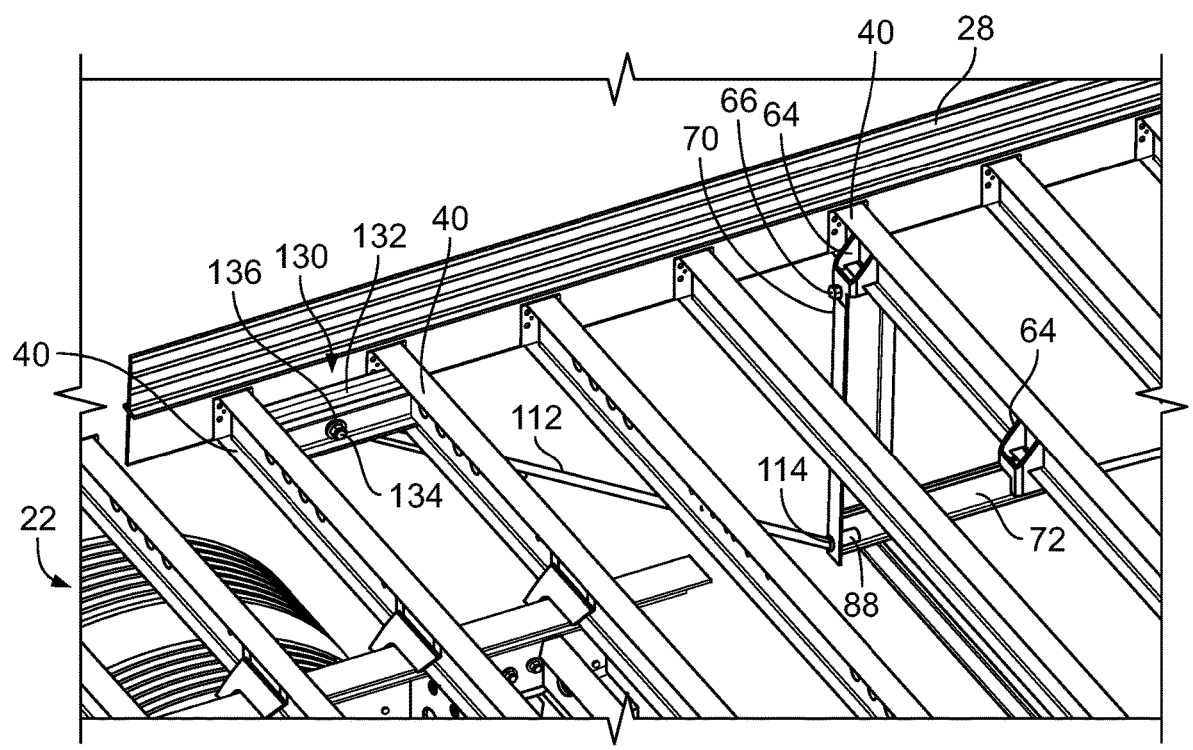
FIG. 13 is a partial perspective rear, topside view of the side underride system of FIG. 2 with the side skirt system removed for clarity.
Figure 16:
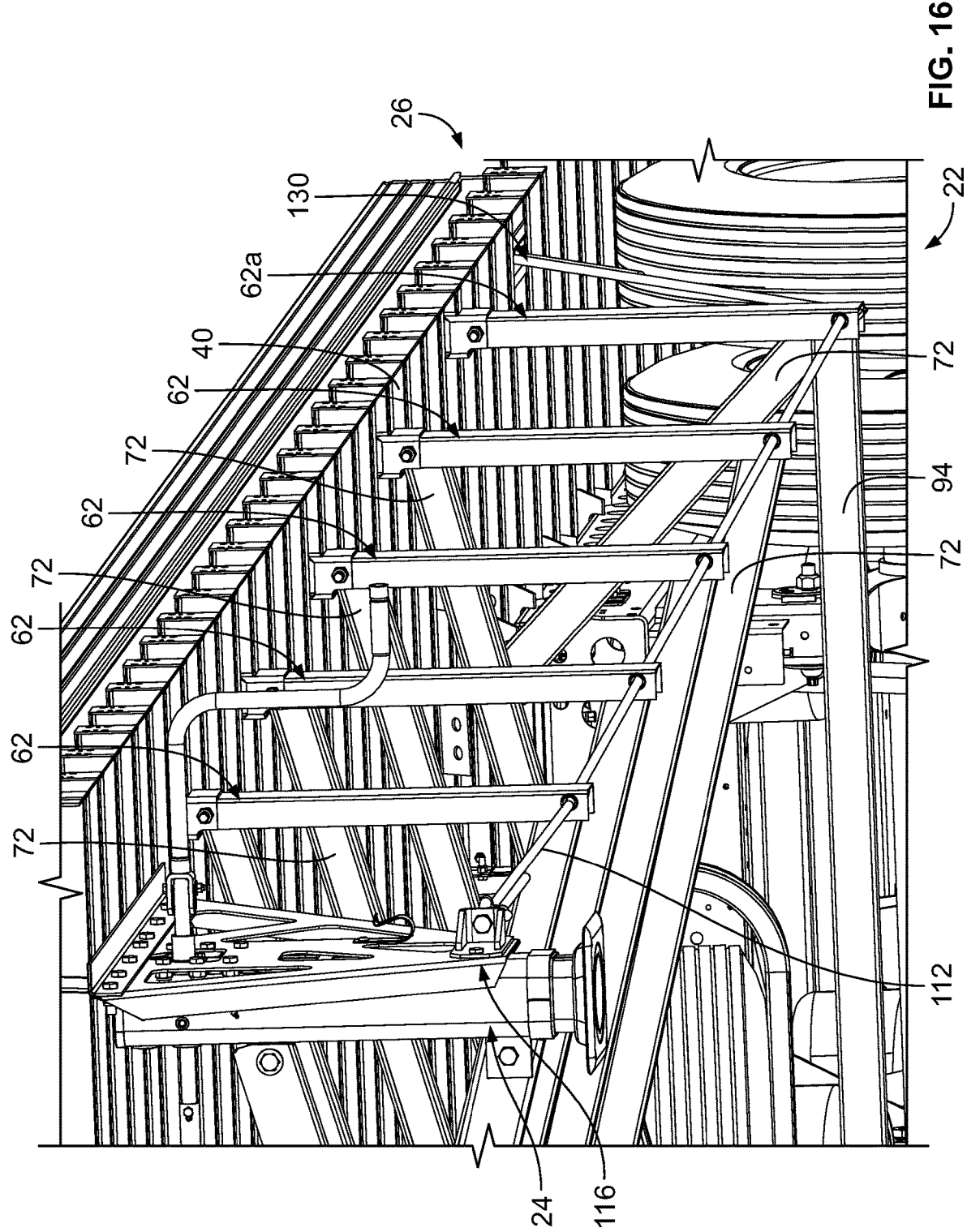
FIG. 16 is a perspective front, underside view of the side underride system of FIG. 2 with the side skirt system removed for clarity.
Figure 17:
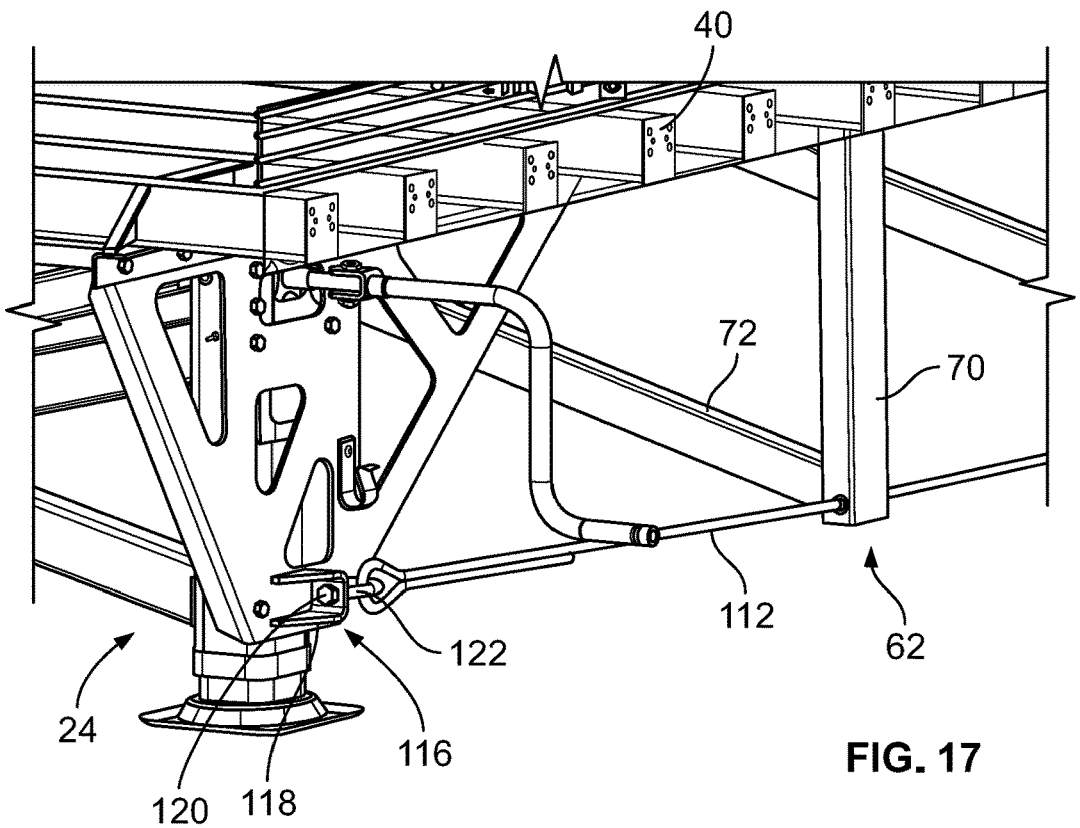
FIG. 17 is a perspective front, topside view of an anchor point for a cable system of the side underride system of FIG. 2.

In some embodiments, as shown in FIGS. 12 and 13, each vertical post 70 of the cross-braces 62 may include an aperture(s) or channel 114, and the cable 112 may be routed through the apertures 114 in tension to form the support system 54 of connected cross-braces 62. Illustratively, the apertures 114 may be positioned near the lower portion 96 of each vertical post 70. Furthermore, in some embodiments, the respective apertures 114 may also receive the bolts 88 that couple together the truss beams 72 and vertical posts 70 of each cross-brace 62, as described above. In such embodiments, the bolts 88 may be hollow to provide a channel through which the cable 112 is routed. However, in other embodiments, the vertical posts 70 may include separate apertures for the truss beams 72 and the cable 112, respectively. Additionally, in some embodiments, collars (not shown) may be added on either side of each vertical post 70 to prevent the cable 112 from sliding laterally relative to the vertical post 70 (or reduce such sliding). As a result, if a particular vertical post 70 fails upon an impact, the collar may help transfer load to adjacent vertical posts 70 rather than allowing the cable 112 to be pulled inward by the force of the impact.

In some embodiments, as shown in FIGS. 14 and 15, the cable 112 may be coupled to one or more of the vertical posts 70 to form the support system 54 of connected cross-braces 62. For example, in one embodiment, U-bolts 150 may be coupled to the outer face 74 of each vertical post 70 (as shown in FIG. 14) or, in another embodiment, to an underside 152 of each vertical post 70 (as shown in FIG. 15) via nuts 154 (as shown in FIG. 14A). Illustratively, the cable 112 may be routed through the U-bolts 150 to couple the cable 112 to the vertical posts 70. As a result, in the embodiment shown in FIG. 14, the cable 112 is routed outside of the outer face 74 of the vertical posts 70 (e.g., in comparison to the embodiments shown in FIGS. 4-7 and 12-13, where the cable 112 is routed inward of the outer face 72 of the vertical posts 70). In the embodiment shown in FIG. 15, the cable 112 is routed below the vertical posts 70. Additionally, in some embodiments, the cable 112 may be rigidly attached to the vertical posts 70 to prevent or reduce the cable 112 from sliding laterally relative to the vertical posts 70.

Furthermore, by externally routing the cable 112 through the U-bolts 150, any of the cross-braces 62 can be individually removed and/or replaced without removing the entire cable 112. For example, only the U-bolt connection needs to be removed, and then cross-brace 62 can be removed while the cable 112 remains in place. The cross-brace 62 (or a new cross-brace 62) can then be reinstalled, and the U-bolt 150 coupled to the vertical post 70 around the cable 112 to reconnect the cable 112 to the cross-brace 62.

Illustratively, the cable system 58 may span a length of the trailer 10. In some embodiments, the cable system 58 may span substantially the entire length of the brace system 56 and/or the skirt system 52. For example, as shown in FIGS. 3-7 and 16, the cable 112 may span from the landing gear 24 to the floor assembly 26 adjacent the rear wheel assembly 22. Furthermore, as the cable 112 is routed through the cross-braces 62 (that is, routed inward of the outer face 74 of the vertical post 70) or routed outside of or below the cross-braces 62, the cable system 58 may follow the angled profile of the brace system 56, as shown in FIGS. 6-7. Illustratively, this angled or curved profile of the brace system 56 and the cable system 58 may permit a positioning of the skirt system 52 that is more efficient than a skirt system mounted parallel to the side walls 14 of the trailer 10. The cable flexibility allows the cable system 58 to be routed in different orientations or angles while still being stiff enough to transfer loads to adjoining cross-braces 62. Furthermore, as the cable system 58 may be configured to span the length of the brace system 56 or the skirt system 52, the cable system 58 may include two cables 112 on either side of the trailer 10. It is also contemplated within the scope of this disclosure to include a cable system 58 that spans shorter or longer lengths than the brace system 56 or the skirt system 52. For example, the cable system 58 may span from the landing gear 24 to the rear impact guard 29, or the cable system 58 may be routed across a width of the trailer 10 through or around the rear impact guard 29, the landing gear 24, or other mounting brackets so that a single cable 112 generally forms a continuous cable loop around the trailer 10.

In light of the above, the cable 112 may be coupled to and routed outside of, below, or through the cross-braces 62. Furthermore, the cable 112 may further be permanently or removably coupled to the landing gear 24, the floor assembly 26, and/or other components of the trailer 10. For example, as shown in FIGS. 3-4, the cable system 58 may include an anchor point 116 at the landing gear 24 and an anchor point 130 on the floor assembly 26 adjacent the rear wheel assembly 22. Thus, generally, a first anchor point (such as anchor point 116) may be located forward of the forward-most cross-brace 62, while a second anchor point (such as anchor point 130) may be located rearward of the rearward-most cross-brace 62.

Figure 18:
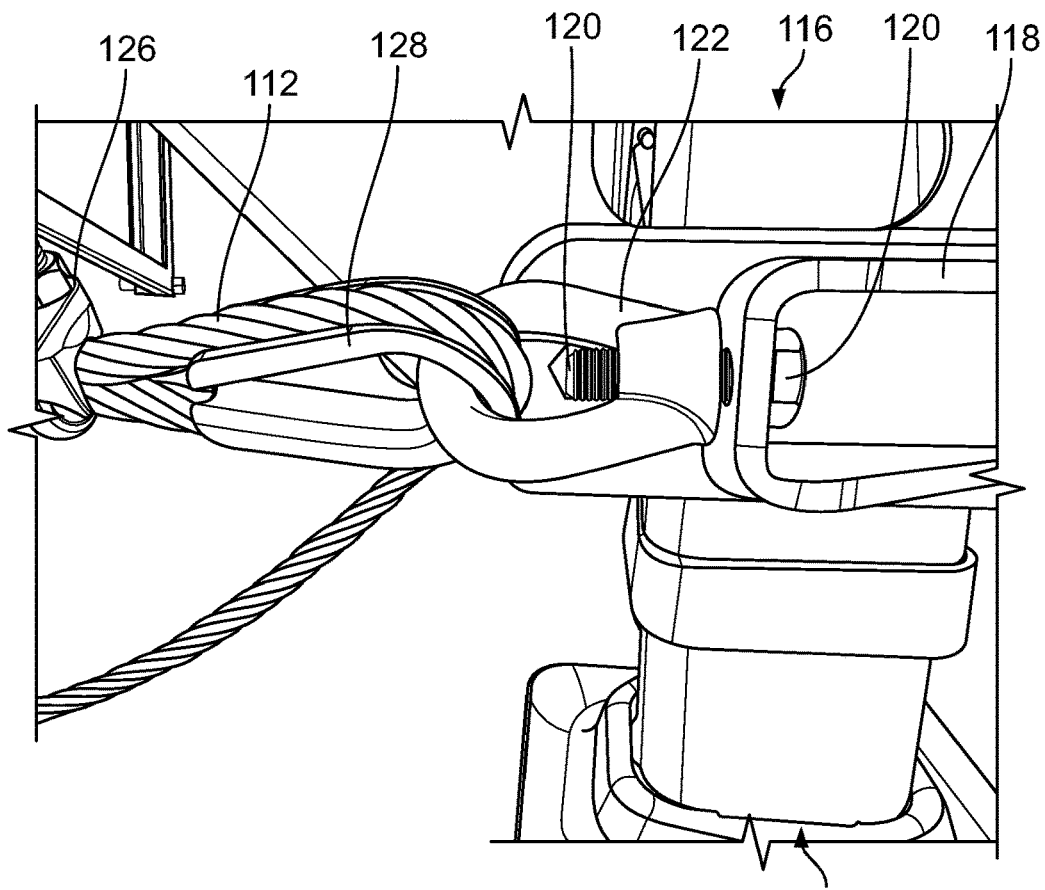
FIG. 18 is a partial side view of the anchor point of FIG. 17.
Figure 18A:
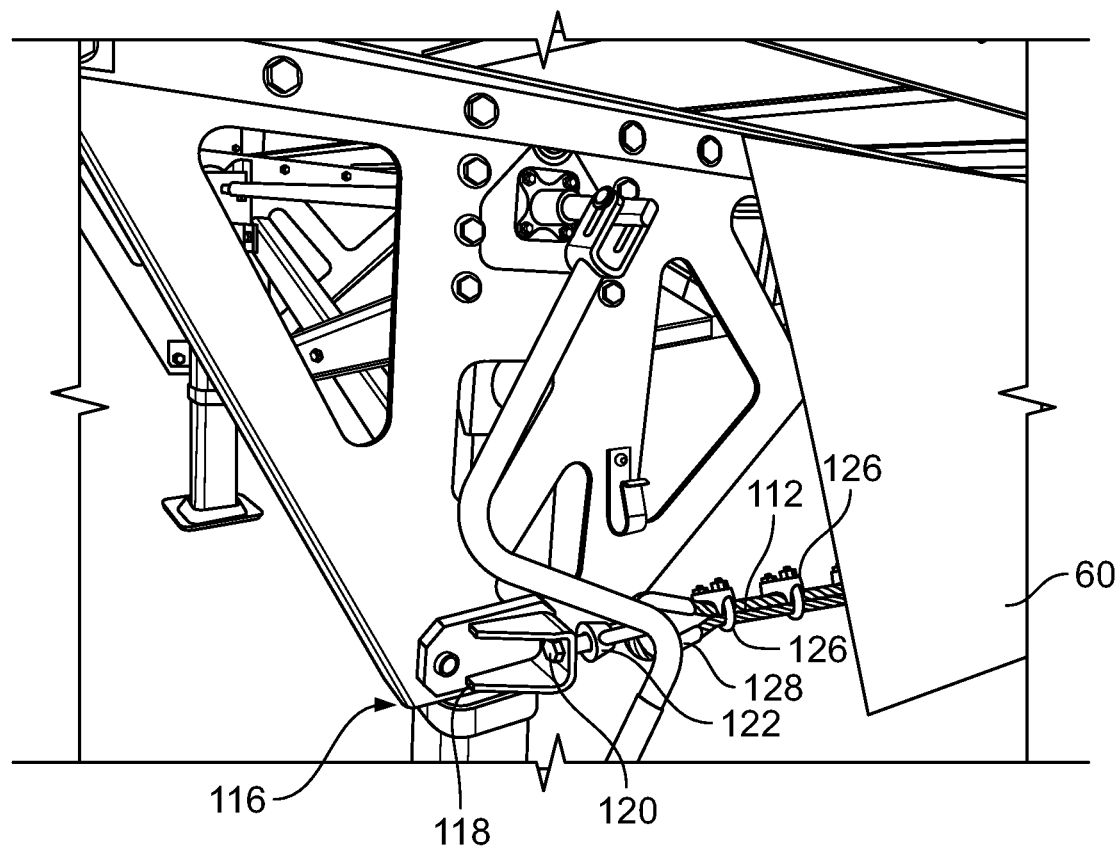
FIG. 18A is partial perspective front, topside view of the anchor point of FIG. 18.

As shown in FIGS. 16-18A, the anchor point 116 may include a bracket 118, a bolt 120, and an eye nut 122. The bracket 118 may be welded to the landing gear 24 and include an aperture (not shown) to receive the bolt 120 therethrough. Further, as shown in FIG. 18, the eye nut 122 may be threaded onto the bolt 120 after the bolt is routed through the aperture, thus securing the bolt 120 to the bracket 118. The cable 112 may be routed through the eye nut 122 and then doubled onto itself for increased strength at the anchor point 116. As shown in FIGS. 18 and 18A, one or more clamps 126 may wrap around the doubled-up portion of the cable 112 to secure the cable 112 at the anchor point 116. Additionally, in some embodiments, as shown in FIGS. 18 and 18A, the anchor point 116 may include a curved sleeve or track 128 to reduce stress on the cable 112 where it routes through the eye nut 122 and to potentially reduce twisting of the cable 112 at the point where it is routed through the eye nut 122. In some embodiments, the cable 112 may be previously wrapped through the forged eye nut 122 and crimped with the clamps 126 on either end to form a preset length (e.g., as a pre-clamped assembly). Upon installation, the cable 112 may be tensioned at the landing gear 24 by tightening the bolt 120 and eye nut 122 arrangement.

Figure 19A:
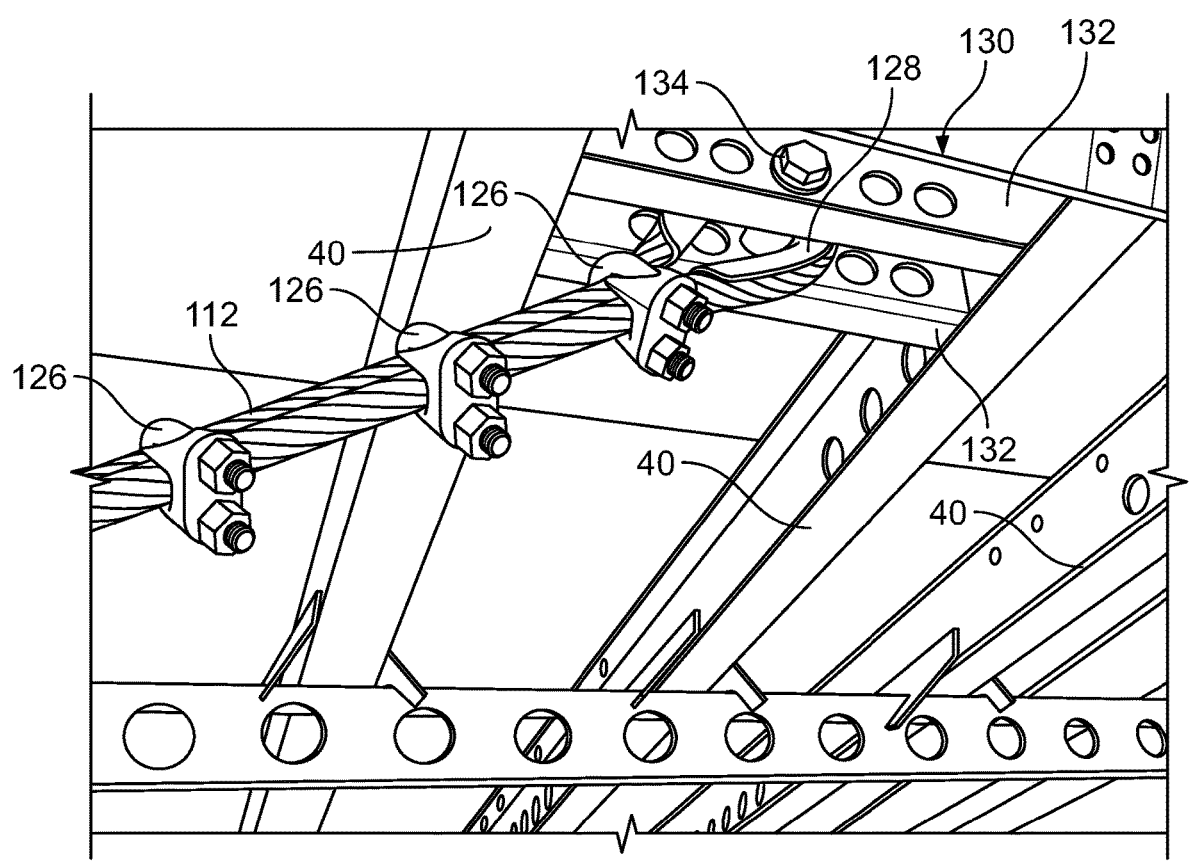
FIG. 19A is another partial perspective underside view of the anchor point of FIG. 19.

FIGS. 13, 16, 19, and 19A illustrate another anchor point 130 of the cable system 58 configured to couple the cable 112 to the floor assembly 26. Illustratively, the anchor point 130 may include two beams 132, a bolt 134, and a nut 136. The beams 132 may each form a C-channel, similar to the vertical posts 70 described above (e.g., with a closed face, two side faces, and an open face). Illustratively, the beams 132 may be coupled between adjacent cross members 40 of the floor assembly 26 so that the closed faces of the beams 132 are adjacent each other, but are spaced apart at an interval wide enough to receive the cable 112 between the beams 132. The bolt 134 may be routed through the two closed faces of the beams 132 to extend across the interval between the beams 132, and the nut 136 may secure the bolt 134 in place. A cable 112 may be routed around the bolt 134 and then doubled onto itself for increased strength at the anchor point 130. As shown in FIGS. 19 and 19A, one or more clamps 126 may wrap around the doubled-up portion of the cable 112 to secure the cable 112 at the anchor point 130. Additionally, in some embodiments, as shown in FIGS. 19 and 19A, the anchor point 130 may include a curved sleeve or track 128 to reduce stress on the cable 112 and/or potentially reduce twisting of the cable 112 where it is routed around the bolt 134.

Alternatively, the anchor point 130 may include a single beam 132. The beam 132 may form a C-channel, similar to the vertical posts 70 described above (e.g., with a closed face, two side faces, and an open face), and may be coupled between adjacent cross members 40 of the floor assembly 26 so that the open face of the beam 132 faces downward. The bolt 134 may be routed through the two side faces of the beam 132 to extend across the open face, and the nut 136 may secure the bolt 134 in place. A cable 112 may be routed around the bolt 134 and then doubled onto itself for increased strength at the anchor point 130, as described above.

Of course, it is within this disclosure to include other anchor points that use other suitable coupling methods along the floor assembly 26, the landing gear 24, and/or other components of the trailer 10. Additionally, in some embodiments, the cable 112 may be further coupled to the skirt wall 60, such as routed through brackets or U-bolts coupled to an inner surface of the skirt wall 60.

In some embodiments, the cable 112 may include one or more steel cables and may be approximately ½ inch to ¾ inch in diameter. In one specific embodiment, the cable 112 may be approximately ⅝ inch in diameter. Of course, it is within the scope of this disclosure to include any number of cables of any diameter made from other suitable materials including composite rope, composite fibers, and other suitable high strength, low stretch materials, and having other suitable diameters. Further, the cable 112 may be covered in ballistic nylon or canvas. Any of the cable concepts, or any other concepts, disclosed in co-pending U.S. application Ser. No. 15/955,209, filed on Apr. 17, 2018, U.S. Provisional Application Ser. No. 62/487,743, filed on Apr. 20, 2017, U.S. Provisional Application Ser. No. 62/487,775, filed on Apr. 20, 2017, and U.S. Pat. No. 8,162,384 may be utilized with the embodiments described herein. The disclosure of such applications are hereby incorporated by reference in their entirety.

Figure 20:
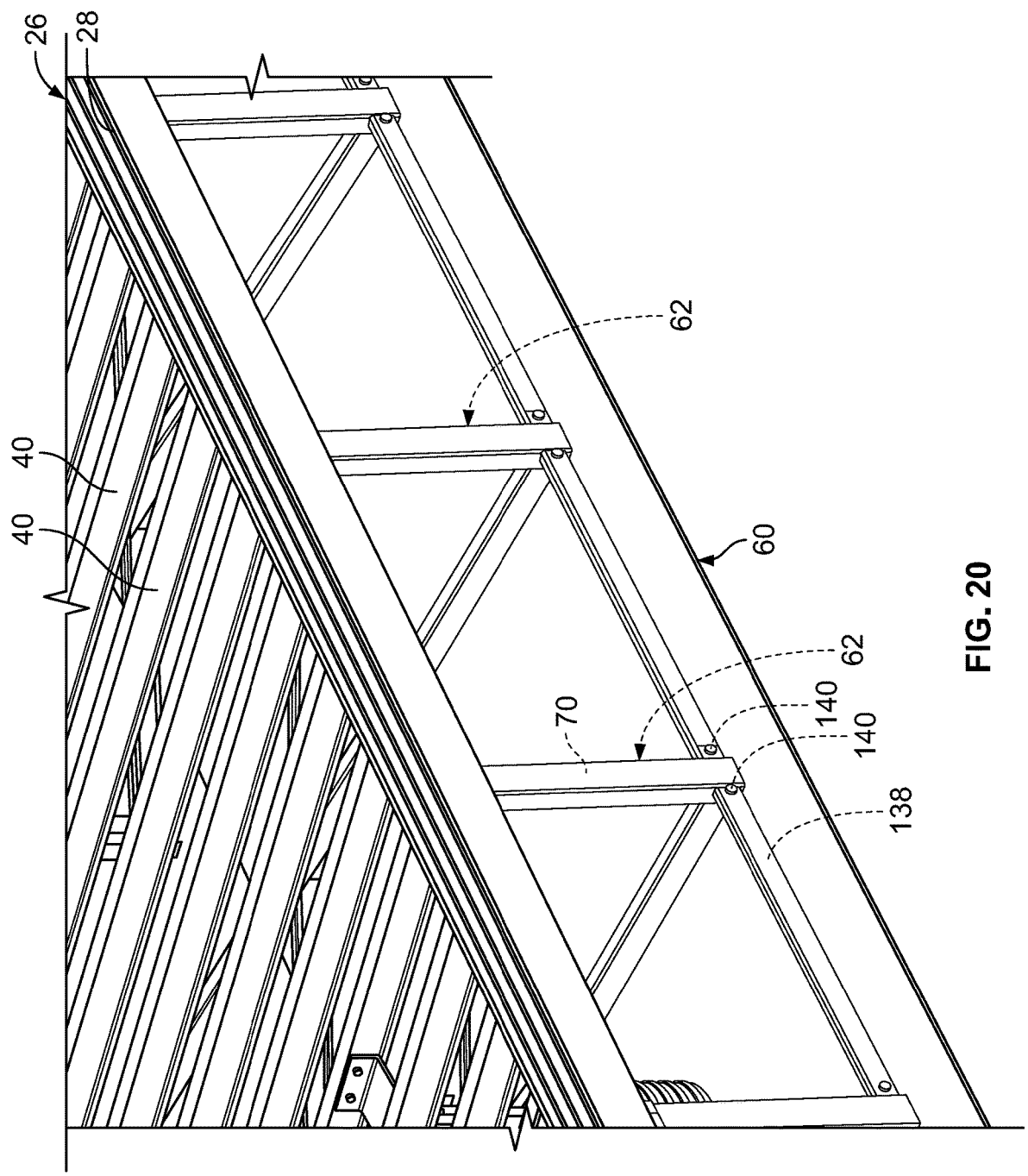
FIG. 20 is a partial perspective topside view of a side underride system including an aerodynamic side skirt system and a support system having cross-braces connected by a rigid member.
Figure 21:
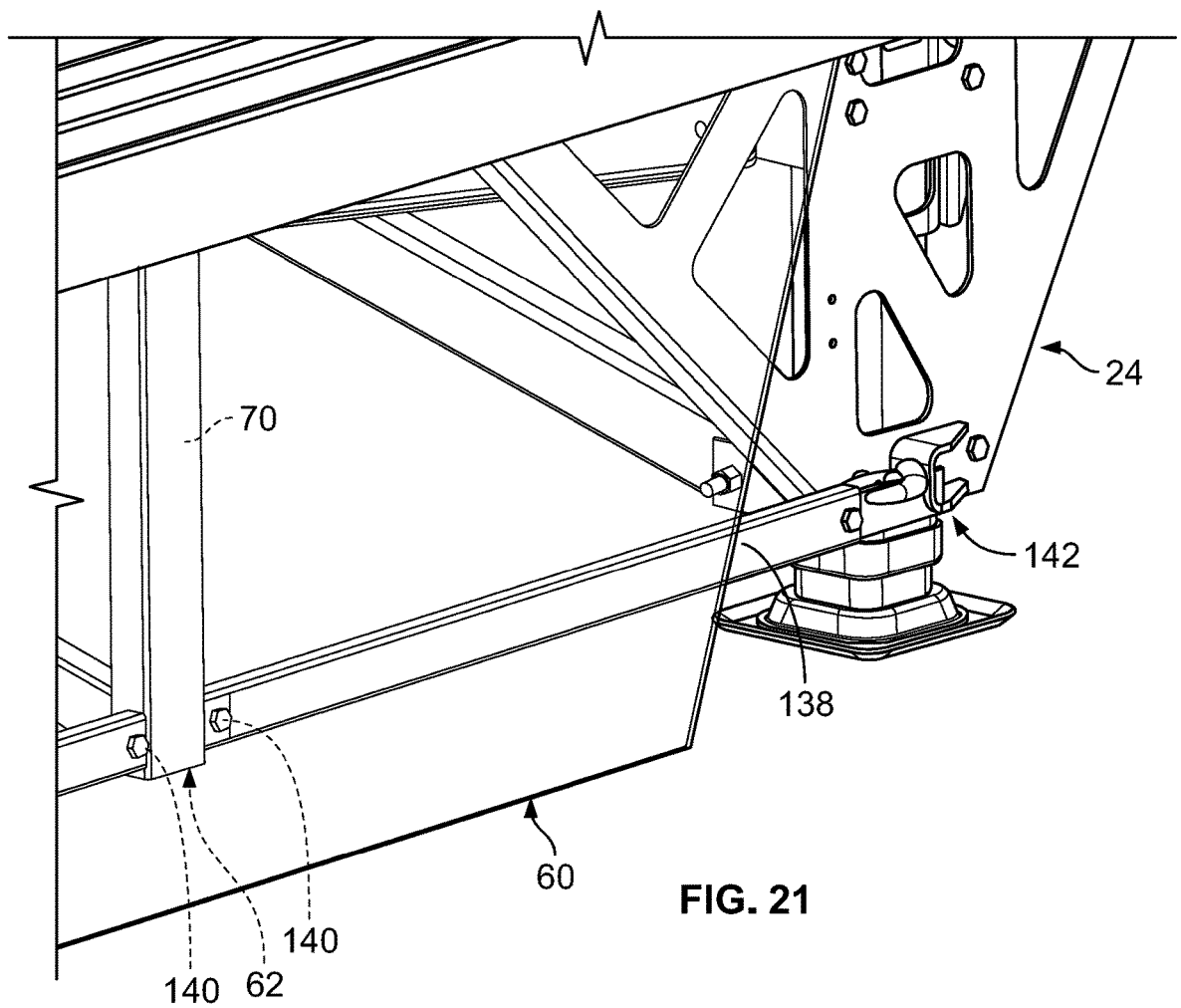
FIG. 21 is another partial perspective topside view of the side underride system of FIG. 20.

In some embodiments, the cable system 58 may be replaced with a rigid member routed through or coupled to the cross-braces 62. More specifically, as shown in FIGS. 20-21, a connecting member 138 may be routed through lower portions of the vertical posts 70, and secured to each vertical post 70 by, for example, bolts 140 or another suitable coupling. The connecting member 138 may serve a similar purpose as the cable 112, such as, but not limited to, helping transfer loads across the brace system 56, limiting movement of the cross-braces 62, and/or maintaining the cross-braces 62 in a plane substantially parallel to the side walls 14. The connecting member 138 may be loaded in tension or compression and may be also be coupled to anchor points at the landing gear 24, the floor assembly 26, and/or another component of the trailer 10. For example, FIG. 21 illustrates the connecting member 138 coupled to an anchor point 142 at the landing gear 24. Due to the tension or compression loading, in some embodiments, the connecting member 138 may only require coupling to a single anchor point 142 (e.g., as opposed to two anchor points 116, 130 required by the cable 112).

Figure 22:
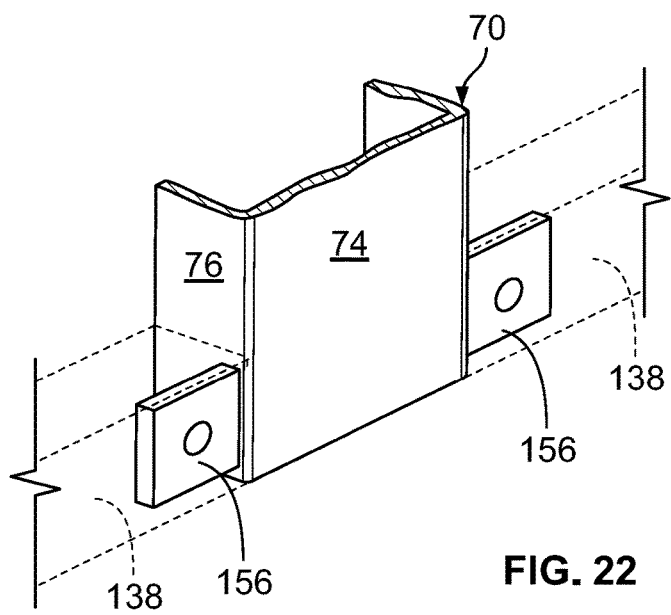
FIG. 22 is a partial perspective view of a vertical post and a rigid member for use with a support system of a side underride system.

Additionally, in some embodiments, as shown in FIG. 22, the connecting member 138 may include a plurality of connecting members 138 spanning the intervals between adjacent vertical posts 70. For example, each connecting member 138 may be coupled to side faces 76 of the vertical posts 70 (as shown in FIG. 22), or to any other portion of the vertical posts 70. In one embodiment, illustratively, the vertical posts 70 may include outwardly extending flanges 156 to which the connecting members 138 may be bolted or otherwise coupled. Of course, it is within the scope of this disclosure to include other mechanisms for coupling the vertical posts 70 to the connecting members 138.

As described above, a trailer 10 may be provided with a side underride system 50 including a skirt system 52 with skirt walls 60 and a support system 54, between the skirt walls 60, having any number of cross-braces 62 and a cable system 58 interconnecting the cross-braces 62. Any one of the support systems 54 described above may be retrofit with existing skirt systems, may be added with new skirt systems, or may completely replace existing skirt systems. The above-described side underride system 50 may provide dual functions of potentially improving aerodynamic efficiency (i.e., via the skirt system) and providing side underride protection (i.e., via the skirt system and the support system) without presenting operational limitations, such as difficult or costly installation, limiting access to the underside of the floor assembly 26, or adding considerable weight to the trailer 10. Alternatively, the above-described side underride system 50 may solely provide side underride protection (i.e., via the support system, without a skirt system) without presenting such operational limitations. Such side underride protection may reduce the risk of passenger vehicle underride in the event of a side impact collision, as well as reduce the risk of pedestrians, bicyclists, or motorcyclists from falling or sliding under the trailer 10, for example, between the landing gear 24 and the rear wheel assembly 22.

Any of the skirt systems, skirt walls, skirt members, etc. described herein may be made of a sandwich composite including a honeycomb core and metal or plastic outer sheets, or the wall panels 32 may be made of a rigid or semi-rigid fiber-reinforced plastic composite. Further, such components may be of any number of suitable, non-composite materials such as metals, metal alloys, and/or plastics, for example. Any of the support systems and/or side underride guards disclosed herein may be utilized alone or in combination with one or more skirt systems, for example, those described with respect to FIGS. 1-3 or any of the other skirt systems disclosed herein or other suitable skirt systems. Furthermore, any of the features of any of the embodiments disclosed herein may be combined with any of the other features disclosed herein or incorporated in any of the embodiments disclosed herein.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, any of the features or functions of any of the embodiments disclosed herein may be incorporated into any of the other embodiments disclosed herein.

We claim:

1. A side underride system configured to be coupled to a trailer, comprising:
a support system configured to be positioned below the trailer to provide side underride protection, the support system comprising:
a brace system including a plurality of cross-braces that each extend across a width of the trailer and are spaced apart at intervals along a length of the trailer; and
a cable configured to extend across the intervals between the cross-braces, the cable further configured to be coupled to the trailer at a first anchor point forward of a forward-most cross-brace of the plurality of cross-braces and coupled to the trailer at a second anchor point rearward of a rearward-most cross-brace of the plurality of cross-braces.

2. The side underride system of claim 1, wherein each of the plurality of cross-braces comprises:
a first vertical post;
a second vertical post opposite the first vertical post;
a first truss beam oriented diagonally and coupled to a lower portion of the first vertical post and an upper portion of the second vertical post; and
a second truss beam oriented diagonally and coupled to an upper portion of the first vertical post and a lower portion of the second vertical post so that the first truss beam and the second truss beam crisscross at an intersection point.

3. The side underride system of claim 2, wherein the first truss beam and the second truss beam are in compression when coupled to the first vertical post and the second vertical post and are coupled together at the intersection point.

4. The side underride system of claim 2, wherein the cable is configured to be coupled to the plurality of cross-braces and routed one of inward of an outer face of the first vertical posts of the plurality of cross-braces, outside of the outer face of the first vertical posts of the plurality of cross-braces, and below the first vertical posts of the plurality of cross-braces.

5. The side underride system of claim 2, wherein the first vertical post and the second vertical post are substantially C-shaped.

6. The side underride system of claim 1, wherein each of the plurality of cross-braces is configured to be coupled to a floor assembly of the trailer.

7. The side underride system of claim 6, wherein each of the plurality of cross-braces is configured to be individually coupled to one or more brackets that is welded to a respective cross member of the floor assembly.

8. The side underride system of claim 1, wherein the plurality of cross-braces extend varying widths across the trailer.

9. The side underride system of claim 1 and further comprising a skirt system comprising:
a first skirt wall configured to be positioned below the trailer near a first side wall of the trailer to reduce airflow under the trailer, and
a second skirt wall configured to be positioned below the trailer near a second side wall of the trailer to reduce airflow under the trailer, and
wherein the support system is configured to be positioned between the first skirt wall and the second skirt wall.

10. The side underride system of claim 9, wherein the first skirt wall and the second skirt wall are each coupled to at least one of the plurality of cross-braces and a floor assembly of the trailer at locations between the plurality of cross-braces.

11. A side underride system configured to be coupled to a trailer, comprising:
a brace system including a plurality of cross-braces, each cross-brace of the plurality of cross-braces comprises:
a first vertical post;
a second vertical post opposite the first vertical post;
a first truss beam oriented diagonally and coupled to a lower portion of the first vertical post and an upper portion of the second vertical post; and
a second truss beam oriented diagonally and coupled to an upper portion of the first vertical post and a lower portion of the second vertical post so that the first truss beam and the second truss beam crisscross at an intersection point,
each cross-brace of the plurality of cross-braces extends across a width of the trailer and is configured to be separately coupled to the trailer as a subassembly unit so that the plurality of cross-braces are spaced apart from one another at intervals along a length of the trailer.

12. The side underride system of claim 11, wherein each cross-brace is configured to be removably coupled to one of a plurality of cross members of a floor assembly of the trailer.

13. The side underride system of claim 12 and further comprising a plurality of brackets each configured to be welded to one of the plurality of cross members, wherein each cross-brace is configured to be removably coupled to the respective cross member via at least one of the plurality of brackets.

14. The side underride system of claim 11 and further comprising a cable system including a cable configured to be coupled to the plurality of cross-braces.

15. The side underride system of claim 11 and further comprising a skirt system including:
a first skirt wall configured to be positioned below the trailer near a first side wall of the trailer to reduce airflow under the trailer; and
a second skirt wall configured to be positioned below the trailer near a second side wall of the trailer to reduce airflow under the trailer, and
wherein the brace system is configured to be positioned between the first skirt wall and the second skirt wall.

16. A method of installing a side underride system on a trailer, the method comprising the steps of:
welding a first bracket to a first cross member of a floor assembly of the trailer adjacent a first end of the first cross member;
welding a second bracket to the first cross member adjacent a second end of the first cross member;
assembling a subassembly by providing a first cross-brace comprising:
a first vertical post,
a second vertical post opposite the first vertical post,
a first truss beam oriented diagonally and coupled to a lower portion of the first vertical post and an upper portion of the second vertical post, and
a second truss beam oriented diagonally and coupled to an upper portion of the first vertical post and a lower portion of the second vertical post so that the first truss beam and the second truss beam crisscross at an intersection point;

after assembling the subassembly, coupling the subassembly to the floor assembly by:
coupling the first vertical post to the first bracket; and
coupling the second vertical post to the second bracket.

17. The method of claim 16 and further comprising:
welding a third bracket to a second cross member of the floor assembly adjacent a first end of the second cross member;
welding a fourth bracket to the second cross member adjacent a second end of the second cross member;
assembling a second subassembly by providing a second cross-brace identical to the first cross-brace;
coupling the second subassembly to the floor assembly by:
coupling a first vertical post of the second cross-brace to the third bracket; and
coupling a second vertical post of the second cross-brace to the fourth bracket.

18. The method of claim 17 and further comprising routing a cable one of through, outside of, and underneath the first cross-brace and the second cross-brace.

19. The method of claim 17 and further comprising:
coupling a first skirt wall to the first vertical posts of the first cross-brace and the second cross-brace so that the first skirt wall is positioned below the trailer near a first side wall of the trailer; and
coupling a second skirt wall to the second vertical posts of the first cross-brace and the second cross-brace so that the second skirt wall is positioned below the trailer near a second side wall of the trailer.

* * * * *

UNITED STATES PATENT AND TRADEMARK OFFICE
CERTIFICATE OF CORRECTION

PATENT NO. : 10,946,824 B2
APPLICATION NO. : 16/130248
DATED : March 16, 2021
INVENTOR(S) : David P. Kunkel et al.

Page 1 of 1

It is certified that error appears in the above-identified patent and that said Letters Patent is hereby corrected as shown below:

In the Specification

Column 8, Line 64, "241" should be --24--.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*